US012794141B2

(12) United States Patent
Lopez-Tonazzi et al.

(10) Patent No.: US 12,794,141 B2
(45) Date of Patent: Nov. 10, 2026

(54) MULTI-FEED TRACKING ANTENNA WITH STATIONARY REFLECTOR

(71) Applicant: Freefall Aerospace, Inc., Tucson, AZ (US)

(72) Inventors: Juan Carlos Lopez-Tonazzi, Tucson, AZ (US); Terrance Pat, Tucson, AZ (US); Douglas Stetson, Tucson, AZ (US); Brandon Swift, Tucson, AZ (US)

(73) Assignee: Freefall Aerospace, Inc., Tucson, AZ (US)

( * ) Notice: Subject to any disclaimer, the term of this patent is extended or adjusted under 35 U.S.C. 154(b) by 47 days.

(21) Appl. No.: 18/869,825

(22) PCT Filed: Jun. 2, 2023

(86) PCT No.: PCT/US2023/024248
§ 371 (c)(1),
(2) Date: Nov. 26, 2024

(87) PCT Pub. No.: WO2023/235543
PCT Pub. Date: Dec. 7, 2023

(65) Prior Publication Data

US 2025/0316911 A1 Oct. 9, 2025

Related U.S. Application Data

(60) Provisional application No. 63/348,591, filed on Jun. 3, 2022.

(51) Int. Cl.
*H01Q 15/16* (2006.01)
*H01Q 3/18* (2006.01)
(Continued)

(52) U.S. Cl.
CPC ............... *H01Q 15/16* (2013.01); *H01Q 3/18* (2013.01); *H01Q 3/20* (2013.01); *H01Q 5/47* (2015.01); *H01Q 15/24* (2013.01)

(58) Field of Classification Search
CPC ........ H01Q 1/288; H01Q 15/16; H01Q 15/24; H01Q 3/20; H01Q 5/45; H01Q 5/47; H01Q 3/18
See application file for complete search history.

(56) References Cited

U.S. PATENT DOCUMENTS 2,997,711 A 8/1961 Love
4,954,832 A * 9/1990 Grant .................... H01Q 3/245
74/665 G (Continued)

FOREIGN PATENT DOCUMENTS

WO 2009072781 A1 6/2009
WO 2022/079278 A2 4/2022

(Continued)

OTHER PUBLICATIONS

International Search Report and Written Opinion received for PCT Patent Application No. PCT/US2023/024248, mailed on Oct. 11, 2023, 14 pages.

(Continued)

*Primary Examiner* — Thien M Le
(74) *Attorney, Agent, or Firm* — Matney Legal Group PLLC

(57) ABSTRACT

A reflective antenna system for transmitting and receiving electromagnetic radiation, including a reflector that includes a spherical reflective surface. The reflective antenna system also includes a first feed assembly configured to provide the electromagnetic radiation in a first certain direction. The reflective antenna system further includes a second feed assembly configured to provide the electromagnetic radiation in a second certain direction.

18 Claims, 24 Drawing Sheets

(51) Int. Cl.

| | |
|---|---|
| ***H01Q 3/20*** | (2006.01) |
| ***H01Q 5/47*** | (2015.01) |
| ***H01Q 15/24*** | (2006.01) |

(56) References Cited

U.S. PATENT DOCUMENTS

| | | | | |
|---|---|---|---|---|
| 6,204,822 | B1 * | 3/2001 | Cardiasmenos | H01Q 3/18<br>343/781 CA |
| 6,222,492 | B1 | 4/2001 | Mahon | |
| 2006/0145940 | A1 | 7/2006 | Kuroda et al. | |
| 2008/0100523 | A1 * | 5/2008 | Kim | H01Q 3/20<br>343/757 |
| 2008/0204342 | A1 * | 8/2008 | Kharadly | H01Q 1/02<br>343/781 R |
| 2016/0276747 | A1 | 9/2016 | Davis et al. | |
| 2017/0256864 | A1 | 9/2017 | Jensen et al. | |
| 2018/0277948 | A1 | 9/2018 | Brown et al. | |
| 2018/0375214 | A1 | 12/2018 | Runyon et al. | |
| 2019/0067828 | A1 | 2/2019 | Mclaren et al. | |
| 2019/0097309 | A1 | 3/2019 | Marrero-Fontanez et al. | |
| 2020/0044354 | A1 | 2/2020 | Walker | |
| 2020/0185835 | A1 | 6/2020 | Giusto | |
| 2020/0274611 | A1 | 8/2020 | Mendelsohn et al. | |
| 2020/0403312 | A1 | 12/2020 | Guan et al. | |
| 2023/0294014 | A1 * | 9/2023 | Walker | F24S 10/70<br>202/174 |
| 2023/0360902 | A1 * | 11/2023 | Robinson | C02F 1/325 |
| 2024/0213686 | A1 * | 6/2024 | Sezai | H01Q 15/16 |
| 2024/0283146 | A1 * | 8/2024 | Lopez-Tonazzi | H01Q 1/125 |
| 2024/0396212 | A1 * | 11/2024 | Iskakov | H01Q 3/443 |
| 2024/0429615 | A1 * | 12/2024 | Tankielun | H01Q 13/065 |
| 2025/0316911 | A1 * | 10/2025 | Lopez-Tonazzi | H01Q 15/24 |

FOREIGN PATENT DOCUMENTS

| | | | |
|---|---|---|---|
| WO | 2023/017249 | A1 | 2/2023 |
| WO | 2023235538 | A2 | 12/2023 |

OTHER PUBLICATIONS

AW. Love, I.R. E. Transactions, vol. AP-10, No. 5, Sep. 1962, cited in International Patent Application PCT/US/2023/024234, filed Jun. 2, 2023.

International Search Report and Written Opinion received for PCT Patent Application No. PCT/US2023/024234, mailed on Nov. 13, 2023, 14 pages.

* cited by examiner

MULTI-FEED TRACKING ANTENNA WITH STATIONARY REFLECTOR

CROSS-REFERENCE TO RELATED APPLICATIONS

This application is U.S. National Stage entry under 35 U.S.C. § 371 based on International Application PCT/US2023/024248, filed on Jun. 2, 2023, which claims the benefit of priority to U.S. Appl. No. 63/348,591, filed Jun. 3, 2022, titled TRACKING ANTENNA WITH STATIONARY REFLECTOR, which is incorporated herein by reference in its entirety.

TECHNICAL FIELD

The present subject matter relates to a reflective antenna having a stationary spherical reflector, more particularly, to a reflective tracking and scanning antenna having a spherical reflector and a waveguide feed assembly, which is capable of optimizing tracking performance, steering angle, reset speed, and pointing accuracy.

BACKGROUND

The past decades have seen a huge effort into deploying satellites for many purposes, as well as satellite constellations providing communication services with low latency. These constellations use mainly Low Earth Orbits (LEO), Medium Earth Orbits (MEO), and equatorial orbits at different altitudes. Many more are being planned and all require ground antennas capable of pointing and tracking. For orbits with medium to high inclinations, the orbital precession makes the satellites rise and set at different points on the horizon. Also, due to the orbit low altitude (for LEO less than 1,000 Km, sometimes as low as 160 Km), the satellite speed could be more than 8 km/sec reducing the connection time per satellite and increasing the frequency of reconnection with the new rising satellite. These speeds depend on the orbit type and altitude, the orbit inclination, the location of the ground station, and the number of satellites in the constellation. For ground antennas, this means fast-tracking speed, very short reacquisition times, and wide tracking angles in azimuth and elevation. Moreover, these communications systems normally require simultaneous receive and transmit functions in different bands and dual circular polarization.

However, single-feed ground antennas, such as a traditional parabolic antenna, when utilizing multiple satellites, need to perform a "break before make" operation: Once a currently-tracked satellite approaches the exit of the tracking range of the antenna, communications have to be transferred from the currently tracked satellite to the next satellite in the constellation. In order for a single antenna to perform that transfer, the transmission is broken during the time the antenna reflector and feed move from tracking the currently tracked satellite to locate the next satellite in the constellation and reinitiate communications.

Traditionally, to avoid these periods of transmission breakage, the solution has been to use at least two antenna dishes, each with one feed: the first antenna dish tracks a first satellite, while the second dish locates and initiates communications with a second satellite orbiting behind the first satellite. When the first antenna breaks communications with the first satellite due to the first satellite transiting out of the scope of the first antenna, communications are instantly transferred from the first antenna to the second antenna, which has already established communications with the second satellite. While the second antenna communicates with the second satellite, the first antenna locates and initiates communications with another satellite orbiting behind the first satellite. Once the second antenna breaks communication with the second satellite, communications are instantly transferred back from the second antenna to the first antenna, which has already established communications with another satellite. The two antennas will complete this cycle of initiating communications, switching communications, breaking communications, and switching back communications, as the satellites in the constellation orbit across the sky. This process of making new connections with one antenna before breaking connections with another antenna is called a "make before break" operation. However, the drawback to this strategy is that it requires two antennas and two feeds: the first antenna also needs to be sufficiently spaced apart in order to not interfere with the second antenna, and vice versa. The cost in terms of hardware and real estate can double.

Accordingly, there is a need to avoid the disadvantages of such prior art single-feed antenna, and to provide a scanning and tracking antenna capable of optimizing tracking performance, steering angle, reset speed, and pointing accuracy, while eliminating broken transmission time and reducing duplicative hardware components.

SUMMARY

Accordingly, the present disclosure is directed to a reflective scanning and tracking antenna having multiple feeds that is capable of optimizing tracking performance, steering angle, reset speed, and pointing accuracy, thereby substantially improving the performance of related spherical reflector antennas, while eliminating broken transmission time.

An object of the present disclosure is to provide a reflective scanning and tracking antenna system, which is configured to transmit and receive electromagnetic radiation. The reflective antenna comprises a reflector that includes a spherical reflective surface, and a first feed assembly configured to provide the electromagnetic radiation in a certain direction. The reflective antenna further comprises a second feed assembly configured to provide the electromagnetic radiation in a different direction.

Another object of the present disclosure is to provide a reflective scanning and tracking antenna system, which is configured to transmit and receive electromagnetic radiation. The reflective antenna comprises a reflector that includes a spherical reflective surface, and a feed assembly configured to provide the electromagnetic radiation at an operation frequency. The feed assembly includes a dual circular polarization feed that is located along a radial line of the spherical reflector, and RF instruments connected with the dual circular polarization feed, thereby allowing the reflector to transmit the electromagnetic radiation, to receive the electromagnetic radiation, or transmit and receive the electromagnetic radiation.

The features and advantages of the present invention, as well as the structure and operation of various embodiments of the present invention, are described in detail below with reference to the accompanying drawings. The drawing figures depict one or more implementations in accord with the present teachings, by way of example only, not by way of limitation. In the figures, like reference numerals refer to the same or similar elements.

BRIEF DESCRIPTION OF THE DRAWINGS

The features and advantages of the present invention, as well as the structure and operation of various embodiments of the present invention, are described in detail below with reference to the accompanying drawings. The drawing figures depict one or more implementations in accord with the present teachings, by way of example only, not by way of limitation. In the figures, like reference numerals refer to the same or similar elements.

DETAILED DESCRIPTION

Figure 1:
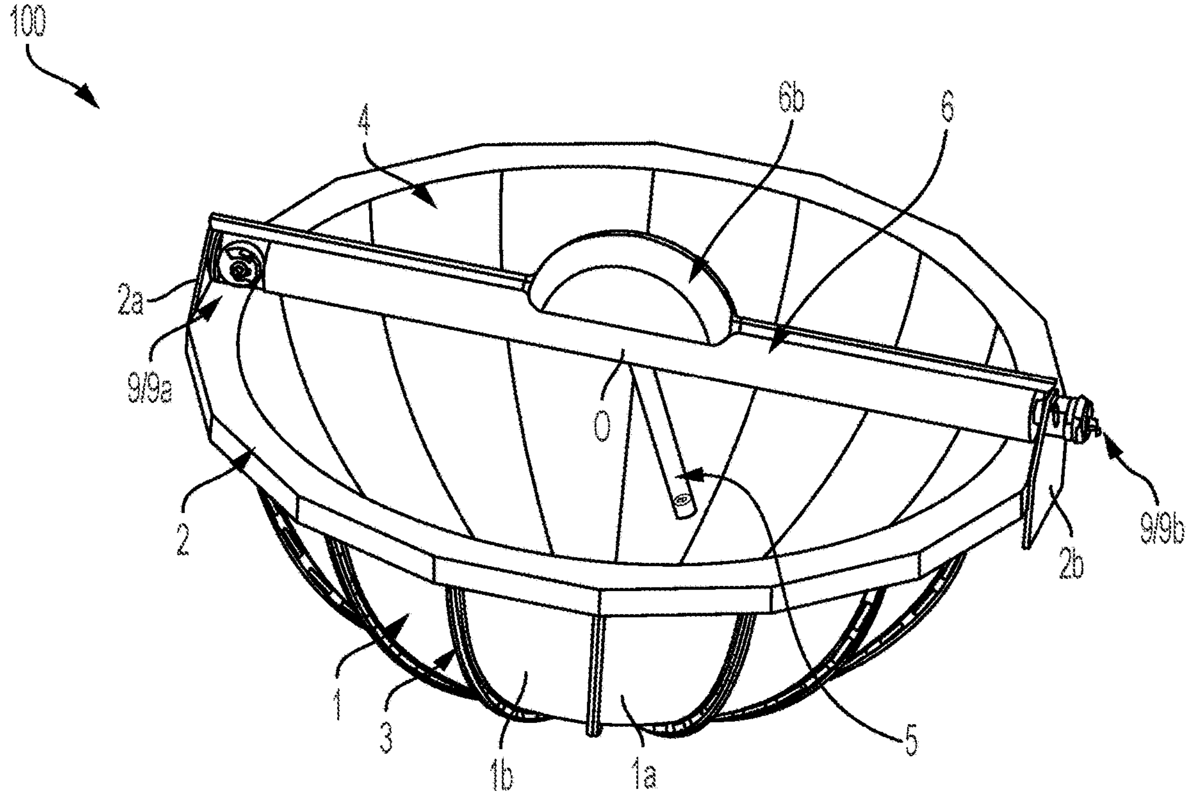
FIG. 1 is a perspective view schematically illustrating a scanning and tracking antenna having a spherical reflector in accordance with one exemplary embodiment.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high level, without detail, in order to avoid unnecessarily obscuring aspects of the present teachings. Also, exemplary embodiments are set forth in detail with reference to the drawings, in which like reference numerals refer to like elements or steps throughout.

The term "coupled" as used herein refers to any logical, physical, electrical, or optical connection, link, or the like by which signals or electromagnetic radiation produced or supplied by one system element are imparted to another coupled element. Unless described otherwise, coupled elements or devices are not necessarily directly connected to one another and may be separated by intermediate components, elements, or communication media that may modify, manipulate or carry the electromagnetic (EM) radiation, such as RF waves, light waves, or other EM signals.

The term quasi-spherical reflective surface used herein refers to a reflective surface that is a portion of a perfect sphere except for small deviations due to manufacturing imperfections or purposely produced to affect some properties of the radiation pattern like modifications at the rim for side-lobe reduction. It may also refer to a portion of a faceted surface spherical on average. The term quasi-spherical reflector used therein refers to a reflector having the quasi-spherical reflective surface as defined above.

Multi-Orbit Embodiment

FIG. 1 is a perspective view schematically illustrating a scanning and tracking antenna 100 in accordance with one exemplary embodiment. The scanning and tracking antenna 100 is configured to be suitable for multiple orbits or precessional orbits cases, including non-geostationary (NGSO) and non-equatorial orbits. The multiple orbits case refers to orbits with non-zero orbital inclination to the equator. In other words, it is for orbits that require substantial variations in elevation and azimuth for antenna scanning and tracking. As shown in FIG. 1, the scanning and tracking antenna 100 may include a spherical reflector 1, a feed assembly 5, a feed support pole 6, and a dual-motor system 9 (including a first motor 9*a* and a second motor 9*b*).

The spherical reflector 1 includes a reflective surface 4. The reflective surface 4 is configured to be reflective and to provide enough conduction at the frequency of use. It may be made of a metal or conductive coating deposited on top of the bulk of the reflector 1. For example, the reflector 1 may have a carbon or glass fiber composite as its main body 1*a* and then have a coating of aluminum as the reflective surface 4. The conductive coating may also be used to improve the surface finish of the reflector 1.

In other embodiments, as will be described later, the spherical reflector 1 may further include a radome (not shown) that is configured to cover the reflective surface 4 to prevent the spherical reflector 1 from being damaged. Also, the spherical reflector 1 may be formed without a radome. The main body 1*a* of the reflector 1 could be made of metal, dielectric, polymer materials, etc., and provides structural support to the reflective surface. The main body 1*a* and the reflective surface 4 can be one unit of the same material.

The reflective surface 4 may be any suitable material with high reflectivity at the wavelengths of interest. For example, the reflective surface 4 may be an approximately 0.5 micron (e.g., 0.5 micron±0.1 micron) or thicker metallic coating applied to the material that forms the main body 1*a*. The metallic coating is applied to an area on one hemisphere of the spherical reflector 1. The reflective surface 4 may be an entire hemisphere of the spherical reflector 1 or less. The metallic coating may be applied to the inside surface of the spherical reflector 1 to form the reflective surface 4. If the main body 1*a* is thin (as well as transparent), the metallic coating may be applied to the outside surface (an outer surface) of the spherical reflector 1 to form the reflective surface 4. Thus, the reflector 1 may be made of metal or preferably of a material that is transparent to radio frequency (RF). Such material may include, but is not limited to, PTFE (Teflon), Plexiglass, Polyethylene, Polycarbonate, and conjugated polymers in general.

When the scanning and tracking antenna 100 transmits a signal, the signal is emitted by the waveguide feed assembly 5 in a direction determined by an angular position of a feed arm of the waveguide feed assembly 5, encounters the reflective surface 4, and reflects back through the aperture of the reflector 1. When the scanning and tracking antenna 100 receives a signal, the process is reversed.

As described above, the spherical reflector 1 may be formed as a single element. Alternatively, as shown in FIG. 1, the spherical reflector 1 may include a plurality of reflecting panels 1*b* (e.g., gore-shaped pieces of material), which are designed suitable to be assembled to form the main body 1*a* of the spherical reflector 1. The plurality of reflecting panels 1*b* have the advantage of being all the same shape. For example, these panels 1*b* may be strips parallel to the equator of the sphere. Preferably, these panels 1*b* may have compound curvature to form a good spherical shape. With a single curvature, the more panels 1*b* are used, the better approximation to a sphere.

The spherical reflector 1 may further include a plurality of reflector structural ribs 3, which are configured to support respective connection portions of the plurality of reflecting panels 1*b*. The ribs 3 serve to provide structural support, and thus may be formed of a light metallic or dielectric material because of weight reasons.

The spherical reflector 1 may include a reflector rim 2 that is configured to cover at top of the panels 1*b* and the ribs 3 to ensure that the panels 1*b* and the ribs 3 are assembled together to form the main body 1*a* as one single reflector element. In this exemplary embodiment, one function of the reflector rim 2 is to provide rigidity to the spherical reflector 1. Another function of the reflector rim 2 is to support the feed support pole 6. For example, the feed support pole 6 may be configured to cross a spherical center point “O” of the spherical reflector 1 and have two end portions fit into respective cross roller bearings 9*c* (in FIG. 2) attached to the reflector rim 2, so that the feed support pole 6 can rotate about its axis.

Referring to FIG. 1, the reflector rim 2 may further include two supporting pads 2*a* and 2*b* attached to an outer side of the reflector rim 2. The two supporting pads 2*a* and 2*b* each have an opening that is sized to receive the respective two end portions of the feed support pole 6 and allow the feed support pole 6 to rotate around its axis. The reflector rim 2 may be formed of a metal material, dielectric material, or any material that is suitable to provide enough structural support to the spherical reflector 1 and to the feed support pole 6. Such material may include, but is not limited to, PTFE (Teflon), Plexiglass, Polyethylene, Polycarbonate, and conjugated polymers in general and metals like Aluminum, Titanium, steel, etc.

Figure 2:
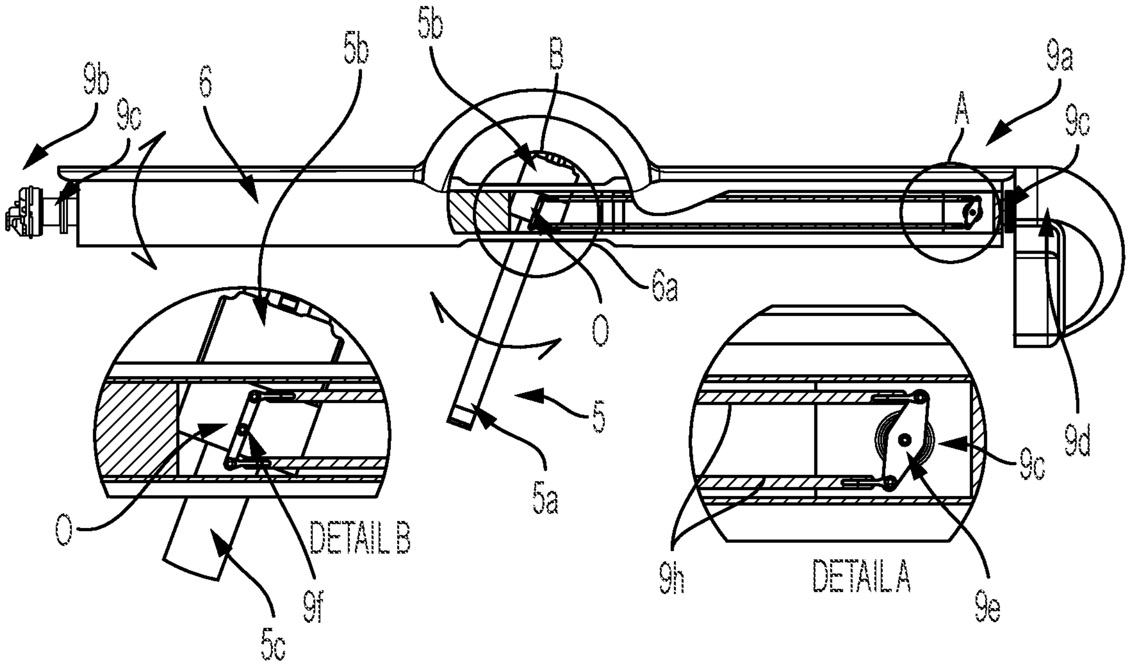
FIG. 2 is a sectional view of a feed support pole of the spherical reflector of the scanning and tracking antenna of FIG. 1, showing feed position movement in accordance with one exemplary embodiment.

FIG. 2 is a sectional view schematically illustrating the feed support pole 6 of the spherical reflector 1 of the scanning and tracking antenna 100 of FIG. 1, showing feed position movement in accordance with one exemplary embodiment. The feed support pole 6 may be configured as a low-loss structure, which is made of a material where there is little energy absorption of radiation going through. One example of such a material is glass fiber. In another embodiment, surfaces of the feed support poles 6, which may potentially block the signal, can be painted with rf absorbing paint like RF-IE50 from EMR Shielding Solutions Inc.

As shown in FIG. 2, the feed support pole 6 may include a hollow portion 6*a*, which is formed in the center of the feed support pole 6 and extends toward the two end portions of the feed support pole 6. The hollow portion 6*a* of the feed support pole 6 is shaped and sized to receive the waveguide feed assembly 5 so that the waveguide feed assembly 5 is able to be pivotally attached to the feed support pole 6, thereby making pivotal movement around the spherical center point “O”. The spherical center point “O” serves as a pivot point around which the waveguide feed assembly 5 rotates. The hollow portion 6*a* is configured to allow the waveguide feed assembly 5 to be pivotally steered, by the dual-motor system 9, with a typical maximum of ~+/−75 degrees with respect to boresight (360 degrees in azimuth), which is enough to steer for most practical applications. Depending on the feed illumination pattern and allowing for some gain reduction, steering angles of ~85 degrees are achievable. The feed support pole 6 may include a cover 6*b* that is configured to cover the hollow portion 6*a* and to protect the waveguide feed assembly 5 that is at least partially accommodated inside the hollow portion 6*a*. The cover 6*b* may be made of transparent material. Examples of such material may include, but are not limited to, PTFE (Teflon), Plexiglass, Polyethylene, Polycarbonate, and conjugated polymers in general.

Referring back to FIG. 1, the dual-motor system 9 includes the first motor 9*a* and the second motor 9*b* which are provided at the two end portions of the feed support pole 6, respectively. As shown in FIG. 2, the first motor 9*a* is configured to move the waveguide feed assembly 5 with respect to the feed support pole 6 in a first plane. The second motor 9*b* is configured to move the feed support pole 6 around its axis, thereby moving the waveguide feed assembly 5 in a second plane perpendicular to the first plane. In this embodiment, the first motor 9*a* may be associated with a linkage mechanism 9*e*-9*f*. With such a configuration, the waveguide feed assembly 5 is able to perform a pivotal motion around the pivot point "O". In other words, the waveguide feed assembly 5 is able to pivotally move with respect to the feed support pole 6.

Also, the dual-motor system 9 may include a cover 9*d* at each end portion of the feed support pole 6 (only shown on the right side in FIG. 2). The cover 9*d* may be configured to cover and protect cables and electronics of the dual-motor system 9. The cover 9*d* may be made of rf transparent material. Examples of such a material may include, but are not limited to, PTFE (Teflon), Plexiglass, Polyethylene, Polycarbonate, and conjugated polymers in general. The pair of rods 9*h* may be made of a metal material, such as aluminum or the like.

The waveguide feed assembly 5 is configured to receive electromagnetic radiation such as RF waves, or other EM signals that are reflected off the reflective surface 4 and/or emit the electromagnetic radiation that is reflected off the reflective surface 4. For example, as shown in FIG. 2, the waveguide feed assembly 5 may be configured to include a feed 5*a* (not shown in detail) and an RF element 5*b*, which are configured as one unit. By such a configuration, in a transmitting mode, the rf energy, which is generated in the RF element 5*b*, is carried to the feed 5*a* through a connection element 5*c* and then is radiated by the feed 5*a*. In a receiving mode, the process is reversed, and the RF element 5*b* collects the rf energy captured by the feed 5*a*. The connection element 5*c* may include, but is not limited to, at least one of a waveguide, coaxial cable, and the like connector.

In this exemplary embodiment, the feed 5*a* may be a dual circular polarization feed that is located along a radial line and close to the paraxial focal point of the spherical reflector 1. A radial line is an imaginary line that passes through the center of the sphere defined by the spherical reflector 1. The spherical reflector 1 has a focal segment instead of a focal point like a parabola, but for narrow pencils of radiation (paraxial case). A focal point may be situated at half the radius. For a given feed, an optimal position may be found by simulation or field testing. In practice, a slight defocusing can prove beneficial to improve some features like sidelobes reduction. Examples of the RF element 5*b* may include, but are not limited to, a block upconverter (BUC), a low noise amplifier and downconverter (LNB), a power amplifier (PA), a transceiver, and the like. The feed 5*a* and the RF element 5*b* may be integrated as one unit in any suitable manner. In this exemplary embodiment, the RF element 5*b* may be attached to one end of the feed 5*a*.

The spherical reflector 1 may be a stationary reflector. While not shown, the antenna 100 having the spherical reflector 1 may be mounted at a lighter load placed on the ground, thereby achieving rapid mechanical reset.

In one embodiment, the spherical reflector 1 may have a 2-meter diameter reflective surface that yields a ~2-degree beam at X-band frequencies (i.e., 8.0 to 12.0 gigahertz). At X-band frequencies, the supported uplink and downlink data rates of the antenna 100 may be between 3 and 50 megabits per second (or more, depending on spherical reflector diameter and transmitter power) for Ethernet-like connections. In other embodiments, the sphere may be other sizes, from the size of a beach ball to up to 3 meters (for operating at 115 GHz in the W-band). In addition to X-band communications, the antenna 100 may provide high bandwidth communications at frequencies in the S-band to the W-band. Moreover, there is no limit to the maximum size of the sphere. Also, in principle, there is no limit to the frequency band except for very high frequencies due to the fabrication of very small waveguide feeds.

With the above-described configurations of the reflective antenna system, the antenna 100 is a wide-angle scanning and tracking antenna with a stationary reflector. Moreover, the feed and rf electronics assembly 5 can be arranged so that its center of mass coincides or is close to the steering pivoting point "O", thereby reducing the torque necessary to move it. With this exemplary configuration, the size, weight, power, and cost of the actuators/motors are reduced. More importantly, this exemplary configuration also allows for fast and precise steering of the feed 5*a*. Thus, such an antenna can achieve (1) rapid reset of the feed 5*a* by properly selecting motors with enough torque, speed, and accuracy to steer the beam to a next position in a predetermined period of time; (2) wide-angle steering of the feed 5*a* at typically ~+/−75 degrees with respect to boresight (360 degrees in azimuth); (3) due to the particular way the feed 5*a* that may be moved without angular constrains, there is no "keyhole" effect, allowing smooth passing of the zenith and beyond; and (4) low weight of the antenna 100 and low power consumption to move the antenna 100, to allow for rapid mechanical reset and signal reacquisition of the antenna 100. In applications of the above described reflective antenna system, signal reacquisition in a switchover to a rising satellite can be accomplished under 0.3 seconds, short enough for practical cases with satellites on the same orbit. By contrast, a conventional parabolic antenna is much slower and, in some instances, there is a need to use two antennas, so that when one is tracking the setting satellite, the other is pointing to the raising one.

Single Orbit Embodiment

FIGS. 3A to 3D are views schematically illustrating another scanning and tracking antenna 200 having a quasi-spherical reflector 10 in accordance with one exemplary embodiment. This embodiment is applicable for a single orbit case, in which the single orbit may be referred to as an equatorial orbit, a reflector having a reduced size is enough, and a different arrangement of motors is possible because only a limited pointing range is needed. The angular range depends on the antenna location latitude, the orbit's altitude, and the number of satellites in the constellation. The more satellites, the smaller is the angular distance between the satellites. For example, for an 8 Km altitude orbit and 10 satellites, the azimuth coverage necessary at 30° latitude is approximately +/−23 degrees and in elevation approximately +/−2 degrees.

Figure 3A:
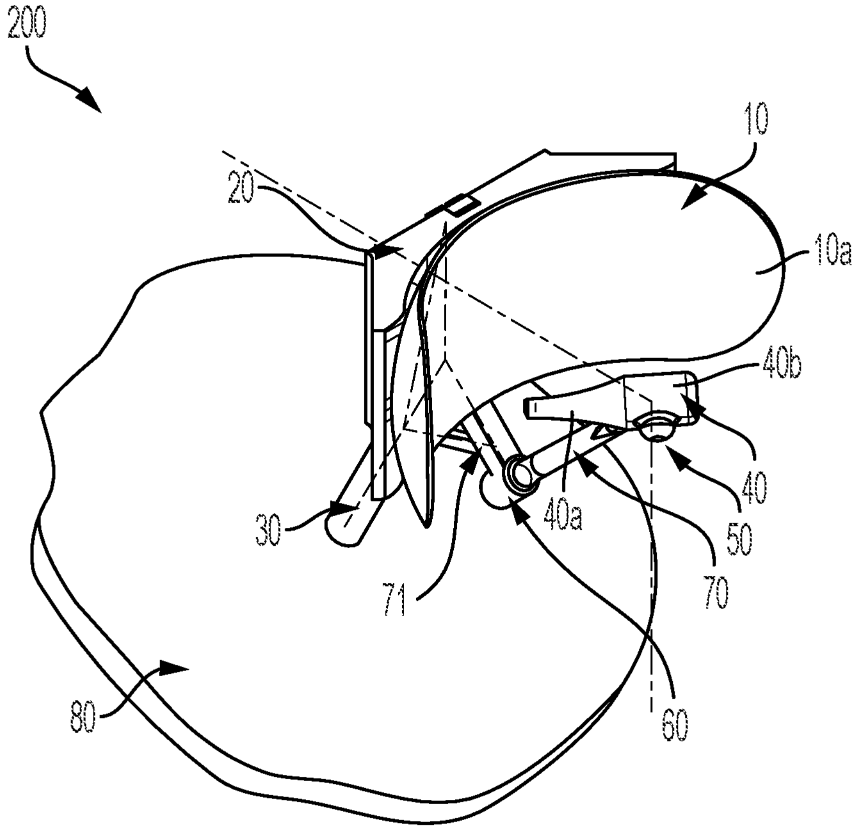
FIGS. 3A to 3D are views schematically illustrating another scanning and tracking antenna having a quasi-spherical reflector in accordance with one exemplary embodiment.

As shown in FIG. 3A, the scanning and tracking antenna 200 includes a quasi-spherical reflector 10 having a quasi-spherical reflective surface 10*a*, a reflector supporting structure 20, a supporting structure post 30, a feed assembly 40, a first motor 50, a second motor 60, and a turning post 70.

Figure 3B:
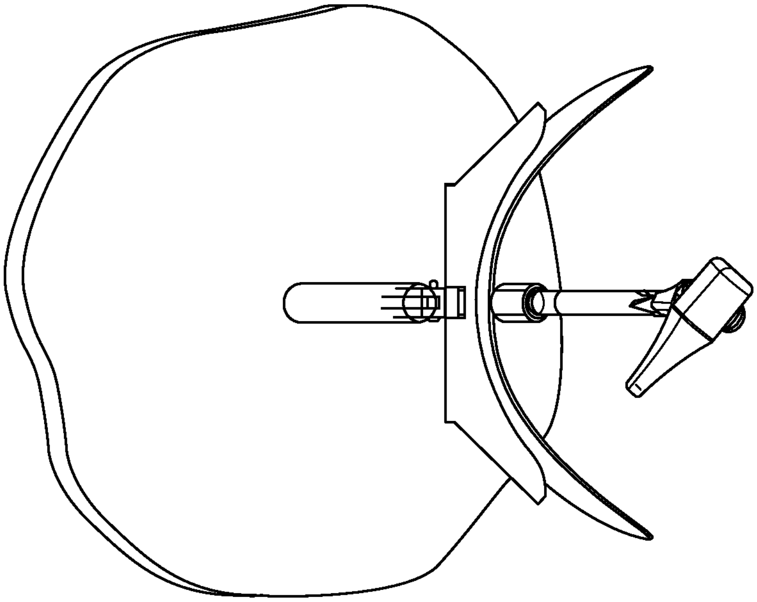
Figure 3C:
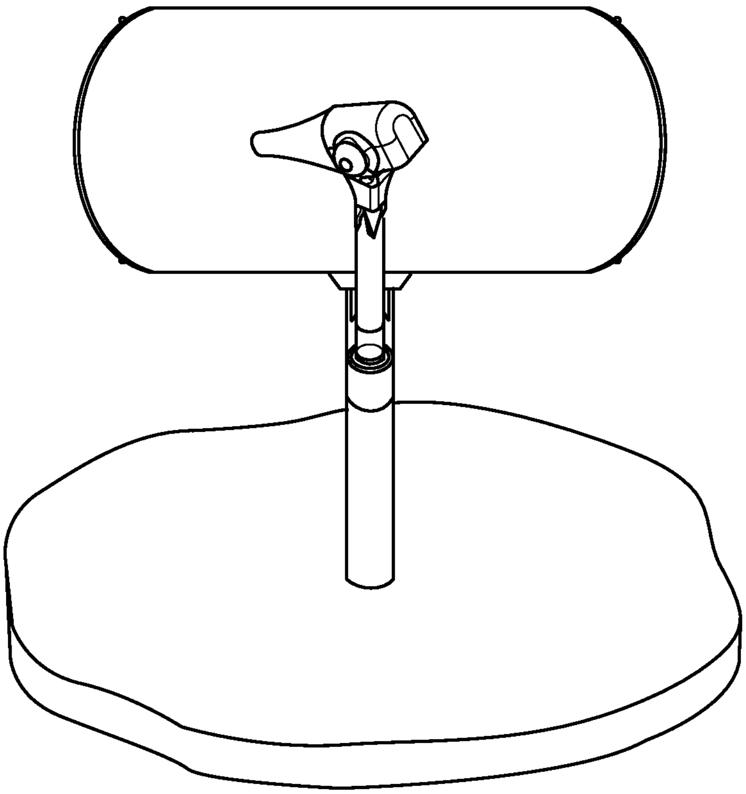
Figure 3D:
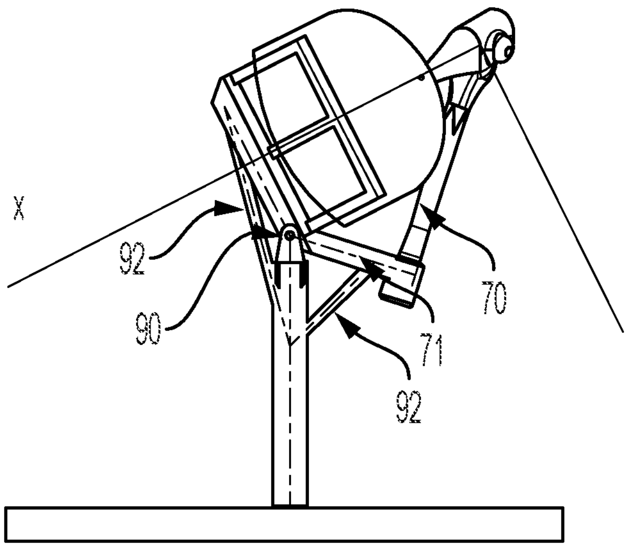

Referring to FIG. 3A, the quasi-spherical reflector 10 is mounted on the reflector supporting structure 20, which is supported by the supporting structure post 30. The supporting structure post 30 can be detachably installed on any desired place 80 of the ground (or on a base stage 80 on the ground or at the top of a building). The waveguide feed assembly 40 is supported by the turning post 70, which is supported in turn by a support arm 71, which is an extended portion of the reflector supporting structure 20. FIGS. 3B, 3C and 3D show other views of the same scanning and tracking antenna 200 shown in FIG. 3A. FIG. 3D shows an exemplary mechanism that is configured to adjust the antenna direction. The turning post 70 and the support arm 71 may be formed to be an "L" shaped mechanism as shown in FIG. 3D, such that an angle between the turning post 70 and the support arm 71 is 90 degrees.

When the scanning and tracking antenna 200 transmits a signal, the signal is emitted by the waveguide feed assembly 40 and encounters the reflective surface 10*a*, which directs the signal. When the scanning and tracking antenna 200 receives a signal, the signal encounters the reflective surface 10*a*, which focuses the signal into the waveguide feed assembly 40.

The first motor 50 may be configured to be activated by a steering controller (not shown) to pivot the waveguide feed assembly 40 mostly in elevation, and the second motor 60 may be configured to be activated by the steering controller (not shown) to rotate the waveguide feed assembly 40 mostly in azimuth by rotating the turning post 70. In this type of configuration, pure azimuth and elevation coordinates with respect to the axis of the quasi-spherical reflector 10 are coupled, and instructions to the first and second motors 50 and 60 may be calculated by the antenna controller that performs mathematical calculations based on input from users, or the like software calculator.

Figure 4:
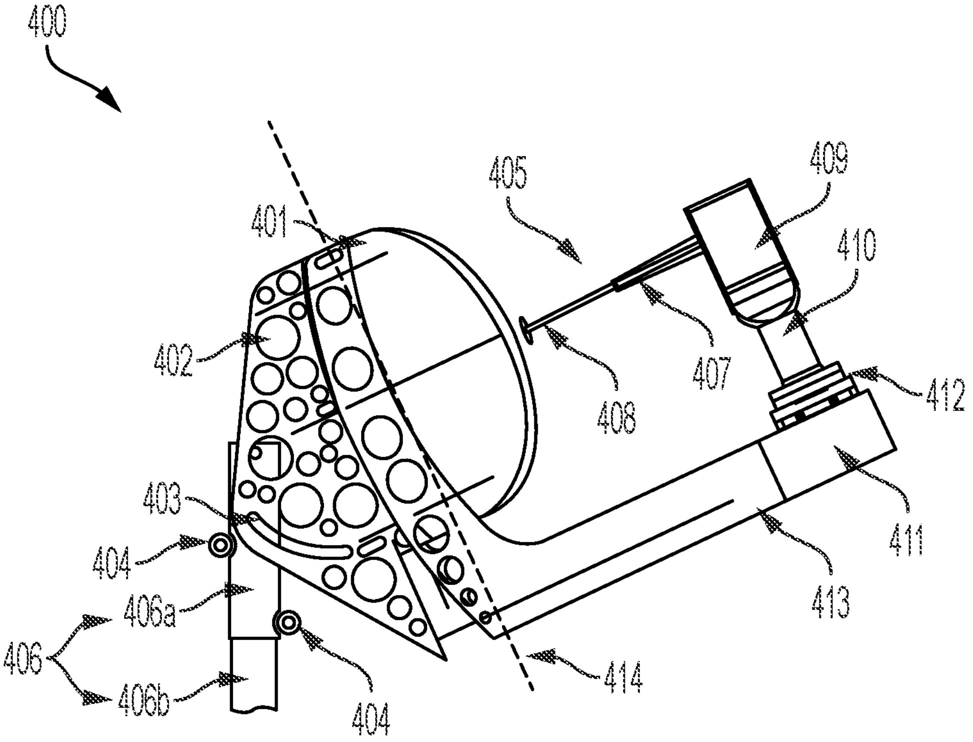
FIG. 4 is a view schematically illustrating still another scanning and tracking antenna having a quasi-spherical reflector in accordance with one exemplary embodiment.

FIG. 4 is a view schematically illustrating another scanning and tracking antenna 400 having a quasi-spherical reflector 401 in accordance with one exemplary embodiment. As shown in FIG. 4, the scanning and tracking antenna 400 includes a quasi-spherical reflector 401 also having a quasi-spherical reflective surface, a reflector supporting structure formed with a plurality of structural pieces 402 and configured to support the reflector 401, a supporting structure post 406 having a mounting tube 406*a* and a mounting post 406*b*, and a feed assembly 405 having a double waveguide 407, a horn and polarizer 408, and rf electronics 409.

The feed assembly is supported by an L-shaped mechanism extending from the reflector supporting structure. The L-shaped mechanism may include an azimuth mast 410 connected to the rf electronics 409, an azimuth motor enclosure 411, a motor reduction 412 arranged between the azimuth mast 410 and the azimuth motor enclosure 411, and a support arm 413 extending from the reflector supporting structure and connected to the azimuth motor enclosure 411. The reflector supporting structure is mounted on the mounting tube 405 and further includes at least one slot for elevation adjustment of the reflector 401 by adjusting the hardware 404 configured for elevation adjustment. Moreover, the mounting tube 405 is configured to be movable along the mounting post 406.

The L-shaped mechanism of FIG. 4 is different from the L-shaped mechanism of FIG. 3D such that the "L" is oriented differently with respect to the respective reflectors 10 and 401. In FIG. 4, the azimuth mast 410 runs parallel to an imaginary line 414 going top to bottom of the reflector 401, and thus azimuth and elevation are decoupled. This means that if the axis of revolution of the azimuth is considered as the "Z" axis of a spherical coordinate system, for any angle of a feed arm (including the double waveguide 407 and the horn and polarizer 408) of the feed assembly, the feed assembly will move in a parallel direction to the edges of the reflector 401. This is similar to a telescope equatorial mount.

Also, in all of the exemplary embodiments, the scanning and tracking antenna 100/200/400/1200/1300/1500/1800 may include a computer (not shown), which has a Graphical User Interface (GUI) that enables the rapid selection of satellites for autonomous acquisition and tracking. The scanning and tracking antenna 100/200/400/1200/1300/1500/1800 may include a radio (not shown) or any suitable electronic device that outputs rf signals to the waveguide feed assembly 5/40/405/1203A-B/1312/1502/1810/1811 for transmission and/or receives signals received by the waveguide feed assembly 5/40/405. The radio outputs signals to the waveguide feed assembly 5/40/405/1203A-B/1312/1502/1810/1811 and receives signals from the waveguide feed assembly 5/40/405/1203A-B/1312/1502/1810/1811 via signal lines (not shown), which may include, for example, one or more coaxial cables. In all cases, a Global Positioning System (GPS) may be added as well as an Inertial Measurement Unit (IMU), for permanent or detachable installation. These options can be helpful in places where the original orientation is lost due to natural disasters such as earthquakes or any other unexpected and/or unintentional events.

In all of the exemplary embodiments, the reflector 1/10/401/1201/1801 may be rigid. The reflective surface thereof may be contiguous or substantially contiguous. For the ground-based applications, including applications where the scanning and tracking antenna 100/200/400/1200/1300/1500/1800 is mounted on a vehicle or watercraft or floats on the surface of a body of water, the waveguide feed assembly 5/40/405/1203A-B/1312/1502/1810/1811 may extend in part along a radial line of the reflector 1/10/401/1201/1801. However, the reflector 1/10/401/1201/1801 may be oriented in any direction, especially in aerial and stratospheric applications.

The waveguide feed assembly 5/40/405/1203A-B/1312/1502/1810/1811 is configured to receive electromagnetic waves that are reflected off the reflective surface thereof and/or emit electromagnetic waves that are reflected off the reflective surface thereof. For example, as shown in FIG. 3A, the waveguide feed assembly 40 may be configured to include a feed 40*a* and an RF element 40*b*. In this exemplary embodiment, the feed 40*a* is a dual circular polarization feed that is located along a radial line of the quasi-spherical reflector 10. Examples of the RF element 40*b* may include, but are not limited to, a block upconverter (BUC), a low noise amplifier and downconverter (LNB), a power amplifier (PA), a transceiver, and the like. The feed 40*a* and the RF element 40*b* are assembled as one unit such that the RF element 40*b* may be attached to one end of the feed 40*a*

FIGS. 3B and 3C are two different views of the scanning and tracking antenna 200 of FIG. 3A. Specifically, FIG. 3B is a top view of the scanning and tracking antenna 200, and FIG. 3C is a front elevation view of the scanning and tracking antenna 200. FIG. 3B is a view showing that an angle of the turning post 70 can be chosen as to convert the second motor 60 in azimuthal with respect to the reflector coordinates. FIG. 3C is another view showing an angle of the turning post 70 that can be chosen to convert the second motor 60 in azimuthal with respect to the reflector coordinates.

FIG. 3D is a perspective view schematically illustrating an exemplary configuration of a mechanism to adjust and fix the orientation of the antenna shown in FIGS. 3A-3C in accordance with an exemplary embodiment. As shown in FIG. 3D, the scanning and tracking antenna 200 includes a first adjusting mechanism and a second adjusting mechanism to adjust and fix the orientation of the scanning and tracking antenna 200. For example, the first adjusting mechanism may be configured to make a pivotal motion around a pivot point 90 at the supporting structure post 30, thereby performing the elevation adjustment. The second adjusting mechanism may be configured to have two sliding support arms 92, which can slide along the supporting structure post 30. By the first and second adjusting mechanisms, the quasi-spherical reflector 10 can be set up optimally according to the latitude where the scanning and tracking antenna 20 is installed and the orbit position and altitude. During installation, the scanning and tracking system is oriented at approximately the average elevation necessary to minimize the range of movement of the feed 40*a* and to maximize the use of the quasi-spherical reflector 10.

Feed Assembly Embodiments

FIGS. 5-8 are diagrams schematically depicting four exemplary configurations of a feed assembly in accordance with an exemplary embodiment. FIG. 9 is a perspective view of one exemplary feed assembly which is configured to have a polarizer arranged between an exemplary waveguide and an exemplary choke horn in accordance with an exemplary embodiment.

Figure 5:
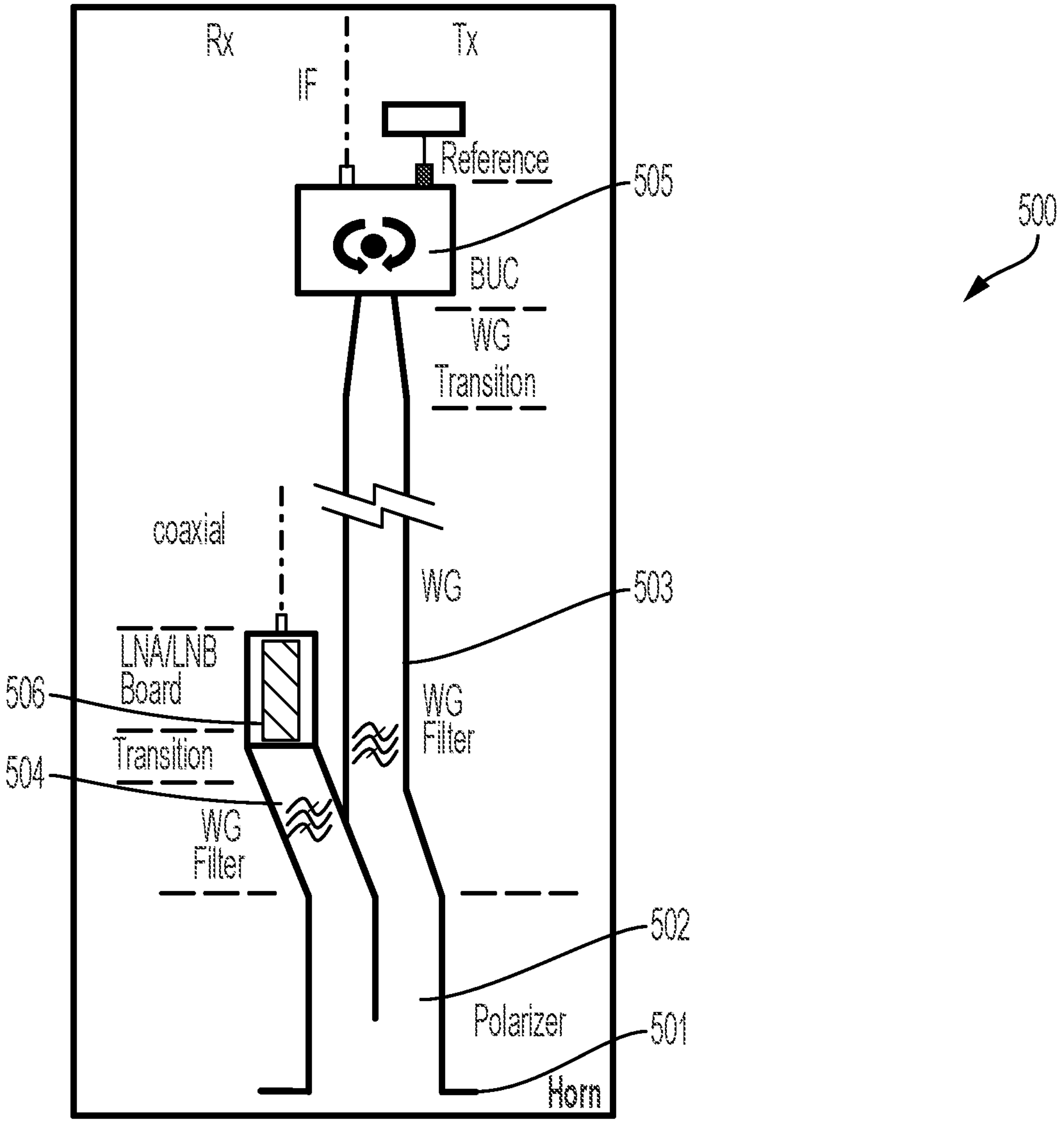
FIG. 5 is a diagram schematically depicting an exemplary configuration of a feed assembly in accordance with an exemplary embodiment.

The exemplary waveguide feed assemblies illustrated in FIGS. 5-8 are applicable to both multiple and single orbit cases. As shown in FIG. 5, a feed assembly 500 is configured to have an optional horn 501, a polarizer 502 (for example a septum polarizer), two separate waveguides 503, 504, a block upconverter (BUC) 505, and a separate low noise amplifier (LNA) board or LNB 506. The waveguide feed assembly 500 integrates the BUC 505 and the separate LNA board 506 with the polarizer 502. By this configuration, the BUC 505 can be an off-the-shelf unit which size and weight preclude it to be positioned together with the polarizer 502 due to the increase in moment of inertia it would cause. At the same time, the LNA (LNB) is positioned close to the polarizer 502, thereby keeping the noise level lower than in the case where it is located at the pivot position.

Figure 6:
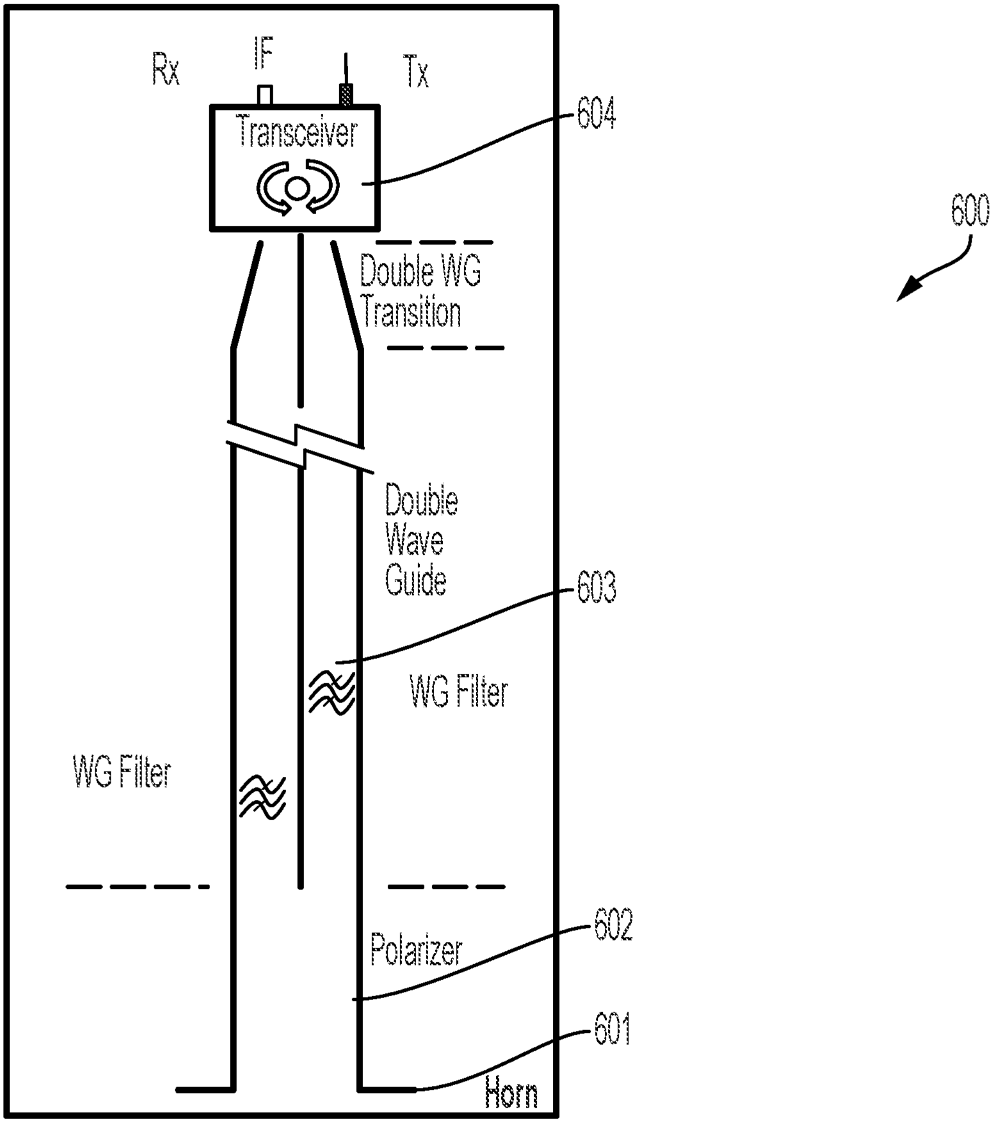
FIG. 6 is a diagram schematically depicting an exemplary configuration of a feed assembly in accordance with an exemplary embodiment.

As shown in FIG. 6, a feed assembly 600 is configured to have an optional horn 601, a polarizer 602, a double waveguide 603, and a transceiver 604. The waveguide feed assembly 600 integrates the transceiver 604 with the polarizer 602. By this configuration, a fully integrated off-the-shelf transceiver 604 can be connected to the polarizer 602 through the double waveguide 603, which also serves as a mechanical mean to hold the horn 601 in the focal position.

Figure 7:
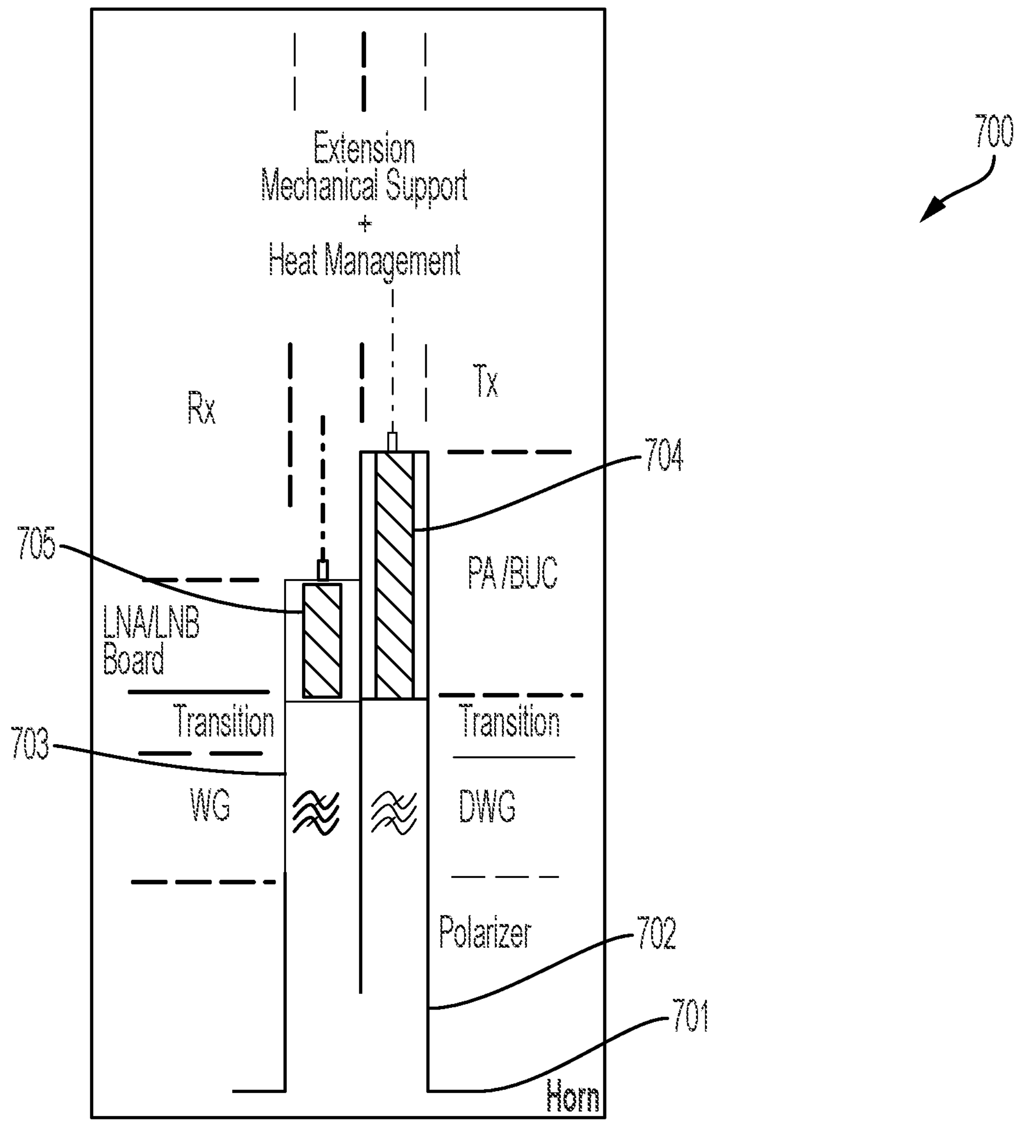
FIG. 7 is a diagram schematically depicting an exemplary configuration of a feed assembly in accordance with an exemplary embodiment.

As shown in FIG. 7, a feed assembly 700 is configured to have an optional horn 701, a polarizer 702, a double waveguide 703, a power amplifier (PA) or BUC 704, and an LNA board or LNB 705. The waveguide feed assembly 700 integrates the PA 704 and the LNA board 705 with the polarizer 702 so that the two RF electronics can be arranged close to the polarizer 702. The customized design of the LNA/LNB electronics 705 positioned just behind the polarizer 702 can reduce the blockage of the reflector 4/10 by eliminating a transceiver that can be bulky.

Figure 8:
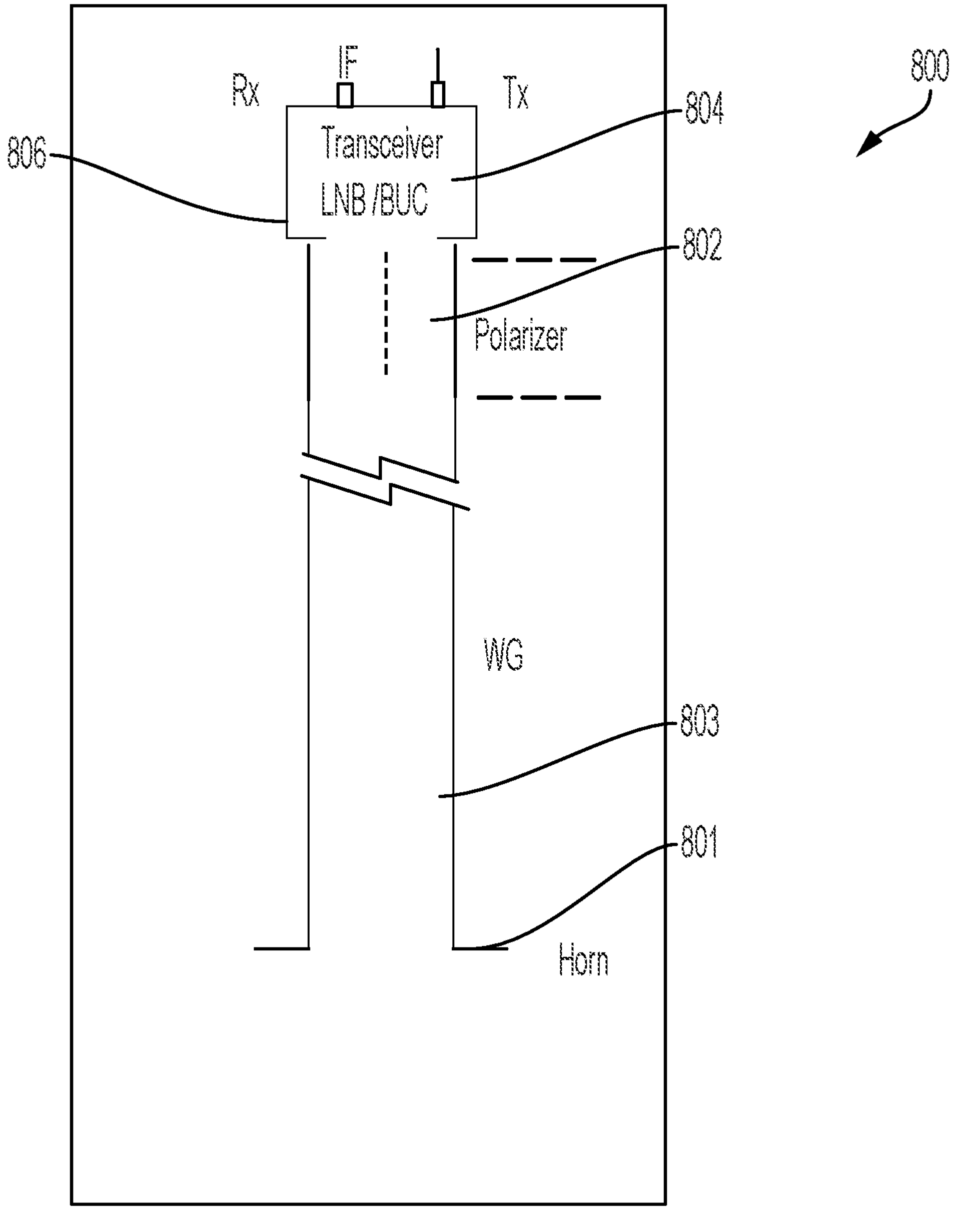
FIG. 8 is a diagram schematically depicting an exemplary configuration of a feed assembly in accordance with an exemplary embodiment.
Figure 9:
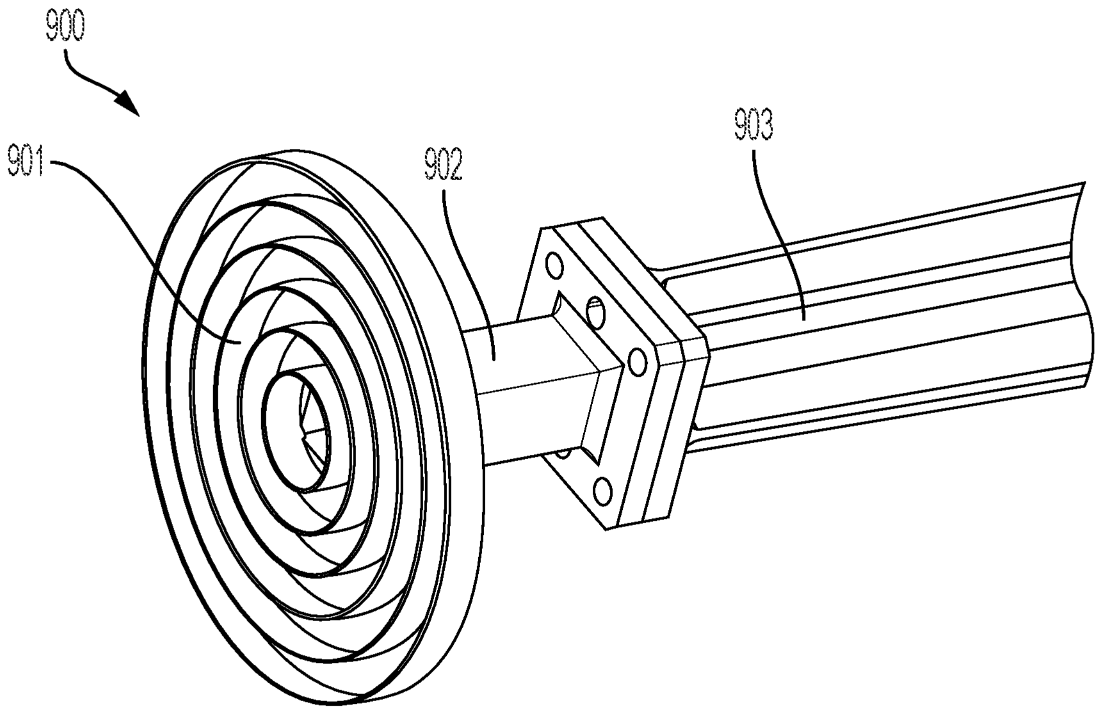
FIG. 9 is a perspective view partially showing one exemplary feed which is configured to have a polarizer arranged between an exemplary waveguide and an exemplary choke horn in accordance with an exemplary embodiment.

As shown in FIG. 8, a feed assembly 800 is configured to have a horn 801, a polarizer 802, a double or single waveguide 803, and rf electronics 804. In this exemplary configuration, the polarizer 802 is arranged adjacent to the rf electronics 804 and is positioned between the waveguide 803 and the rf electronics 804. The rf electronics 804 may include, but are not limited to, the transceiver and the LNB/BUC, which are arranged in a single housing 806 such that they are close to the pivot point (center of the sphere) "O" of the reflector 1/10. From the polarizer 802, the waveguide 803 extends to the horn 801 that is positioned at or close to the focal point of the reflector 1/10. By this configuration, all the rf electronics 804 are concentrated in one housing, thereby achieving easier thermal management of the heat generated by these electronics 804.

As shown in FIG. 9, a feed assembly 900 includes a septum polarizer 902 attached to a section of rectangular double waveguide 903 and a choke horn 901. Other types of horns may be used. The septum polarizer 902 transforms linear polarized radiation into circular and vice versa. The septum polarizer 902 and the waveguide 903 may be integrated in one piece. An antenna system having such a feed assembly 900 is able to provide simultaneous Rx and Tx in opposite circular polarizations. The septum polarizer 902 has been optimized to cover two far apart bands, one for Rx and the other for Tx. While not shown, this feed assembly 900 can integrate any one of the above discussed RF electronics so that they are arranged close to the septum polarizer 902.

In all of the above described exemplary embodiments, the azimuth and elevation scanning ranges may be limited by the size of the reflector 1/10.

While not shown, each of the feed assemblies described above may further include a connecting member that physically connects with the motors. Such a connecting member may be shaped like a bracket and may be made preferably of a material that is transparent to RF. These ancillary elements may be painted with the rf absorbing paint.

Such a feed assembly may include a double waveguide or two separate waveguides, which may be tapered such that the cross section thereof may be made to vary along its length. The invention is not limited to this configuration. A waveguide of the invention may be rectangular in shape or other suitable geometric shapes conforming to the ports.

Figure 10:
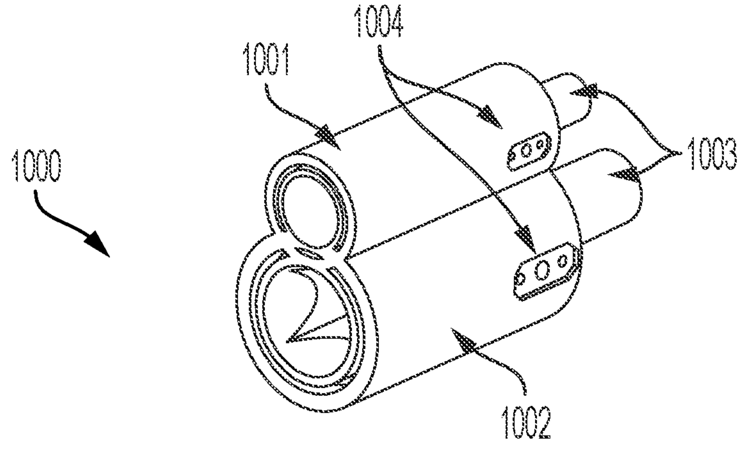
FIG. 10 is a perspective view partially showing one exemplary double-feed assembly which includes one feed for receiving electromagnetic radiation signals/energy and the other feed for transmitting the electromagnetic radiation signals/energy at different frequencies in accordance with an exemplary embodiment.

FIG. 10 is a perspective view partially showing one exemplary double-feed assembly 1000 which includes a first septum polarizer 1001 for the higher frequency band and a second septum polarizer 1002 for the lower frequency band. As shown in FIG. 10, the first and second septum polarizers 1001 and 1002 may be connected side by side or are formed as one unit. Alternatively, the first and second septum polarizers 1001 and 1002 may be configured to be able to shift longitudinally to compensate for differences in a focal point between the feeds. The first septum polarizer 1001 is supported by a support post 1003 and includes two coaxial connectors 1004 (only one is shown in FIG. 10). Similarly, the second septum polarizer 1002 is supported by a support post 1003 and includes two coaxial connectors 1004 (only one is shown in FIG. 10). With such a configuration, it is easy to tune the septum feeds for both bands independently from each other, and this useful feature is advantageous in the situations where the transmit band is too far from the receive band, thereby causing the problem of tuning two bands that are too far apart. The two polarizer feeds can be tilted with respect to each other to have the radiation from both to converge.

Figure 11:
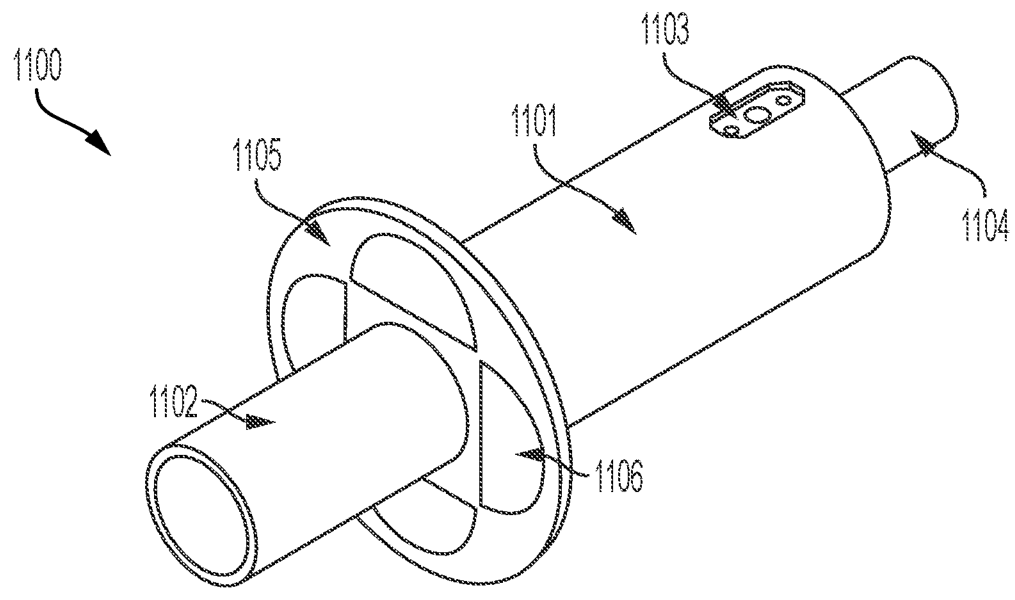
FIG. 11 is a perspective view partially showing one exemplary concentric feed assembly which includes a septum polarizer surrounded by a patch antenna array in a concentric arrangement in accordance with an exemplary embodiment.

FIG. 11 is a perspective view partially showing one exemplary concentric feed assembly 1100 which includes a septum polarizer 1101 surrounded by a patch antenna array 1105 in a concentric arrangement in accordance with an exemplary embodiment. As shown in FIG. 11, the concentric feed assembly 1100 includes the septum polarizer 1101 for the higher frequency band, and a septum polarizer extension 1102 which may be a circular waveguide to adjust the focal point. The concentric feed assembly 1100 further includes a support post 1104 to support the septum polarizer 1101, and the patch antenna array substrate 1105 surrounding the septum polarizer 1101 in a concentric way and positioned between the septum polarizer 1101 and the septum polarizer extension 1102. The patch antenna array substrate 1105 may include a plurality of patch antenna array elements 1106 provided with phase differences such that the radiation is circularly polarized. For example, in the case of a four-element array as shown in FIG. 11, each patch antenna will be shifted by 90 degrees with respect to the next one. The phase shifting, switching, etc. could be done by electronics incorporated in the same board as the antenna elements. An array of different types of antennas could also be used as long as the circular polarization requirement is met. The septum polarizer 1101 may include coaxial connectors 1103 (only one shown in FIG. 11) or it could be extended backwards by a dual waveguide that serves at the same time as mechanical support like in FIG. 9 (no need of the support post 1104 in this case). In this exemplary configuration, the septum polarizer 1101 serves for transmitting at the higher frequency band, and the patch antenna array substrate 1105 around the septum polarizer 1101 serves for receiving EM signals at the lower frequency band. This concentric arrangement can avoid the alignment issues that the above double-feed assembly of FIG. 10 may cause.

Multi-Feed Embodiment

While the above embodiments can achieve signal reacquisition in a switchover to a rising satellite in seconds, ultimately single feed systems, such as a traditional parabolic antenna, need to perform a "break before make" operation. To avoid this period of downtime associated with achieving signal reacquisition, the following embodiments describe antenna designs including two independently-movable feeds, for tracking two separate satellites, allowing for seamless satellite communications using a "make before break" operation. With the following embodiments, a first feed can be tracking a satellite while a second feed is positioning itself to point to the next satellite in a sequence of satellites. At some point, when the second feed is ready, the first feed and the second feed swap functions, and the second feed starts tracking the rising satellite. The first feed disconnects and start moving to search for the next rising satellite in the sequence of satellites. Therefore, throughout this process, the first feed is tracking in a first certain direction, along a first tracking path, and is configured to provide electromagnetic radiation in that first certain direction along that first tracking path. The second feed is pointing in a second certain direction, along a second tracking path, and is configured to provide electromagnetic radiation in that second certain direction along that second tracking path. If the two satellites are on identical or nearly identical orbits, then the first tracking path overlaps and is substantially the same as the second tracking path.

At a point where the first feed and the second feed would cross, the non-tracking feed will change its elevation angle to avoid a collision with the tracking feed. Once passed, the non-tracking feed can move back to the elevation necessary to contact the next satellite. The combined movement continues with the first feed and the second feed alternating the tracking function and passing over or underneath the other one.

The controlling software receives feed positioning information from encoders and pointing information from a controller unit. The software processes the information and calculates movements consistent with collision avoidance and cable management.

Figure 12A:
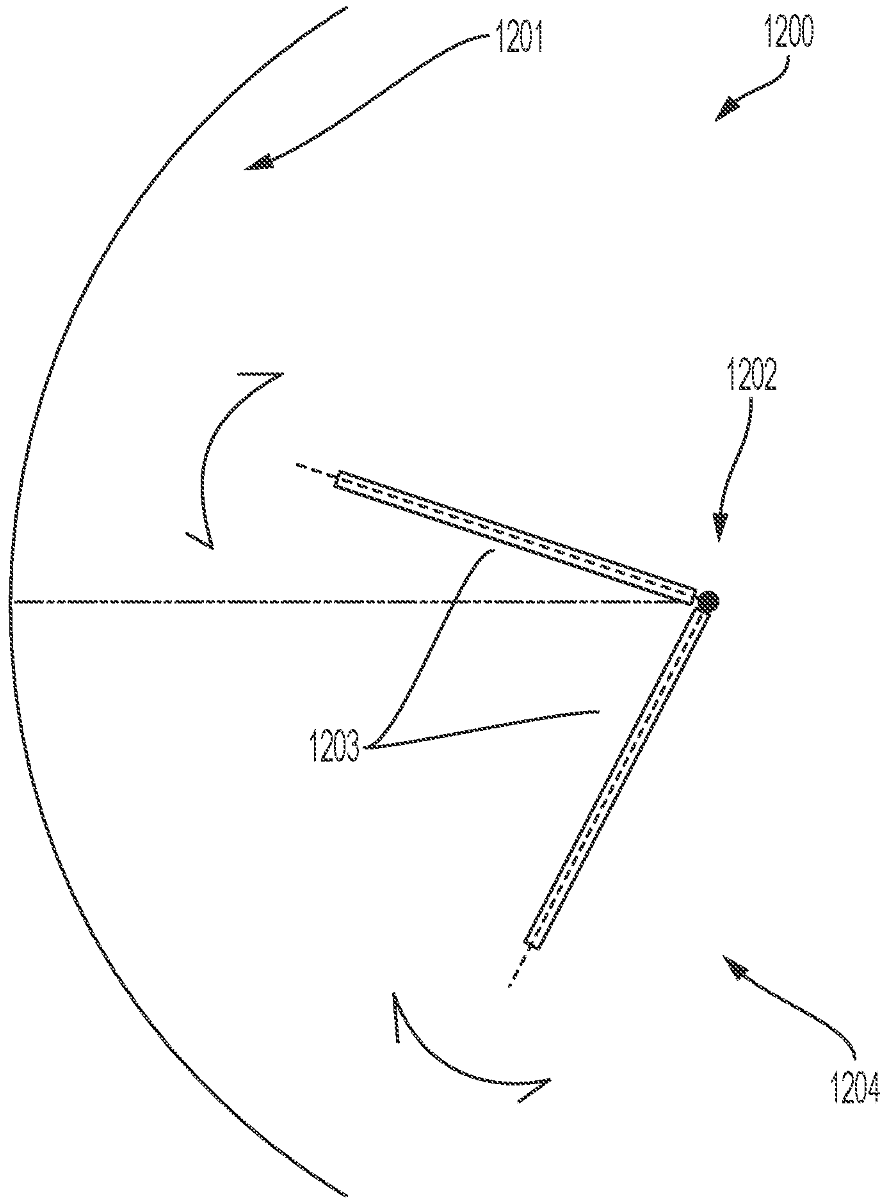
FIG. 12A is a diagram schematically illustrating yet another scanning and tracking antenna having two independent feeds, and the movement of those feeds on a curve parallel to the azimuth between the antenna and a satellite.
Figure 12B:
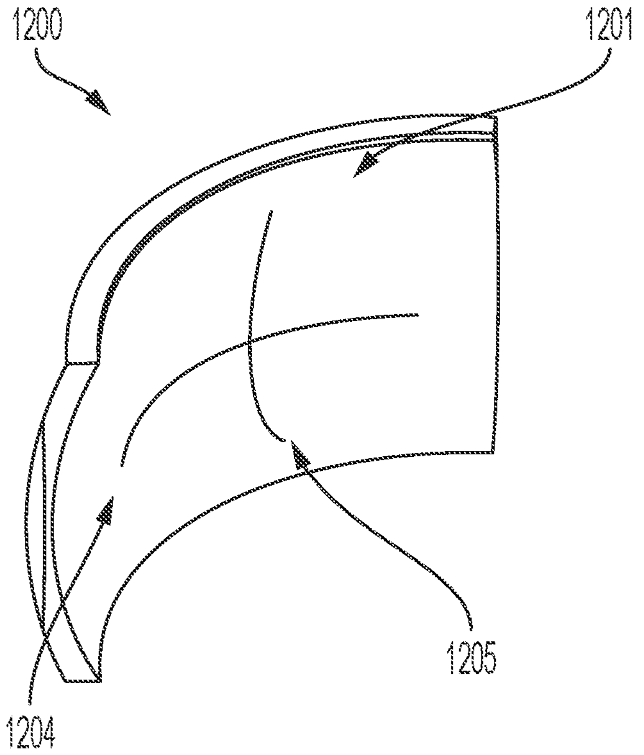
FIG. 12B is a diagram schematically illustrating the reflector of the scanning and tracking antenna of FIG. 12A, including lines parallel to the azimuth and the elevation.
Figure 12C:
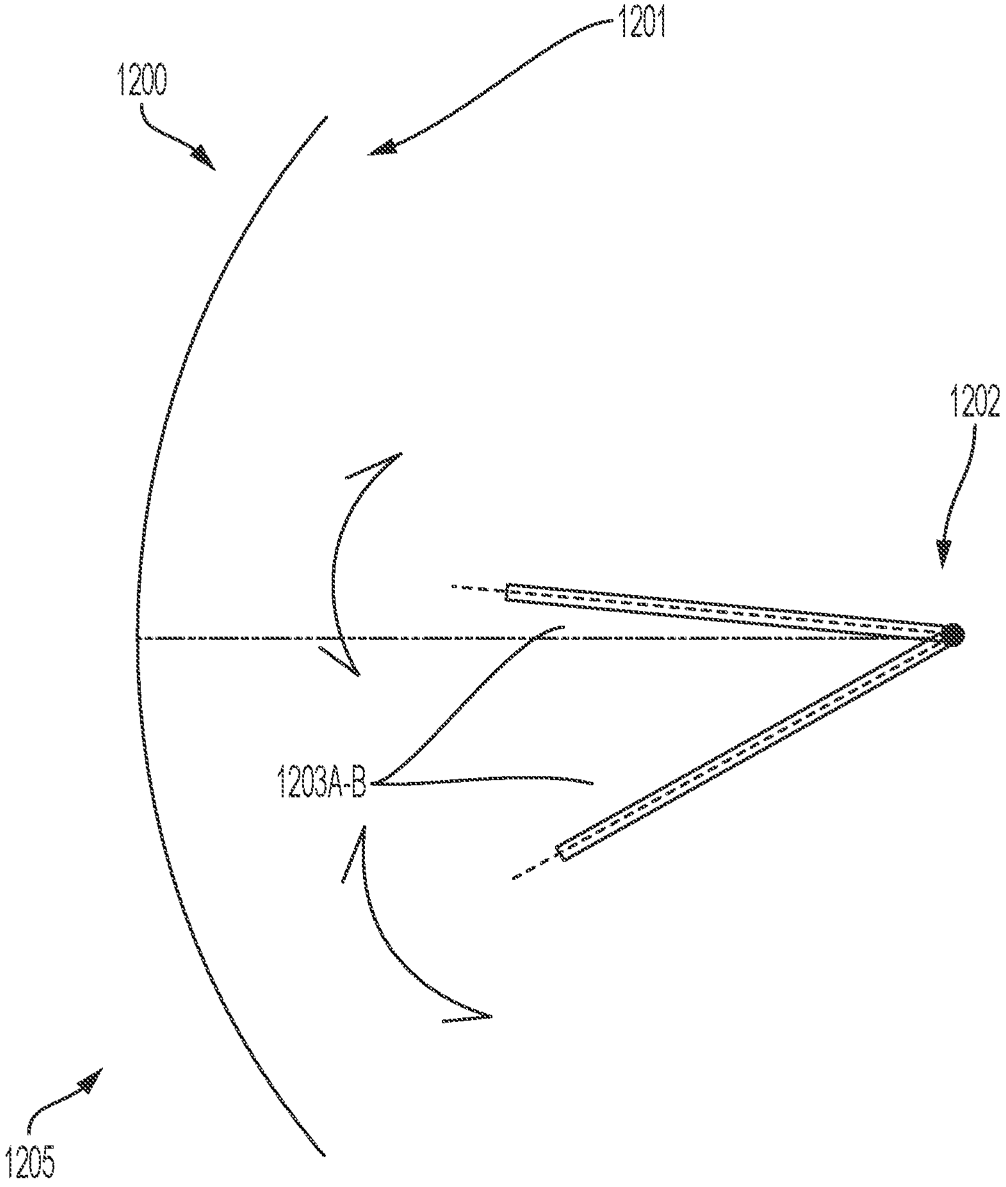
FIG. 12C is a diagram schematically illustrating the scanning and tracing antenna of FIG. 12A, and the movement of those feeds on a curve parallel to the elevation between the antenna and a satellite.

FIG. 12A is a diagram schematically illustrating yet another scanning and tracking antenna 1200 having two independent feeds 1203A-B, and the movement of those feeds 1203 on a curve parallel to the azimuth between the antenna 1200 and a satellite. FIG. 12B is a diagram schematically illustrating the reflector 1201 of the scanning and tracking antenna of FIG. 12A, including lines parallel to the azimuth 1204 and the elevation 1205. FIG. 12C is a diagram schematically illustrating the scanning and tracking antenna of FIG. 12A, and the movement of those feeds 1203A-B on a curve parallel to the elevation between the antenna 1200 and a satellite. The antenna includes a spherical reflector 1201, with the spherical center point 1202 such that any straight line passing through the center point 1202 and extending into the reflector 1201 will be perpendicular to a plane tangent to the surface of the spherical reflector 1201 at the intersection point—an obvious property of the reflector 1201 that is spherical and center point 1202 of that reflector 1201. A first antenna feed 1203A and a second antenna feed 1203B pass through the center point 1202. The first antenna feed 1203A moves independently from the second antenna feed 1203B, and the second antenna feed 1203B moves independently from the first antenna feed 1203A. Each antenna feed 1203A-B is able to move in order to point to any location on the spherical reflector 1201, with an optional allowance for limited movement a certain distance from the edges of the spherical reflector 1201: this allowance limits spillover at the edges of the spherical reflector 1201 and keeps the radiation patterns generated by the first antenna feed 1203A or the second antenna feed 1203B almost unaffected. FIG. 12A visualizes movements parallel to the azimuth curve 1204. FIG. 12C visualizes movements parallel to the elevation curve 1205. Movement of the first antenna feed 1203A or the second antenna feed 1203B is based on a combination of movements parallel to the azimuth curve 1204 and movements parallel to the elevation curve 1205.

In the context of multi-feed antennas, "pointing" to a satellite is the act of aiming a feed 1203A-B at the satellite, such that a transmission emitted by the feed 1203A-B would reach the satellite, but does not include emitting such a transmission. Passive reception by a feed of transmissions from the pointed-to satellite can be included in pointing, and may assist in confirming that pointing of the feed has been performed successfully. "Tracking" a satellite is the act of pointing to a satellite and communicating by sending and receiving transmissions from that satellite.

If a first satellite being tracked by the first antenna 1203A is on the same orbit as a second satellite being pointed to by the second antenna 1203B, at some point the first antenna 1203A will need to cross over the second antenna 1203B to point to a third satellite, while the second antenna transmits to the second satellite. In order to avoid a collision between the first antenna 1203A and the second antenna 1203B, a mechanism is required to avoid collisions, while still maintaining the radial direction of the first antenna 1203A and the second antenna 1203B.

Figure 13A:
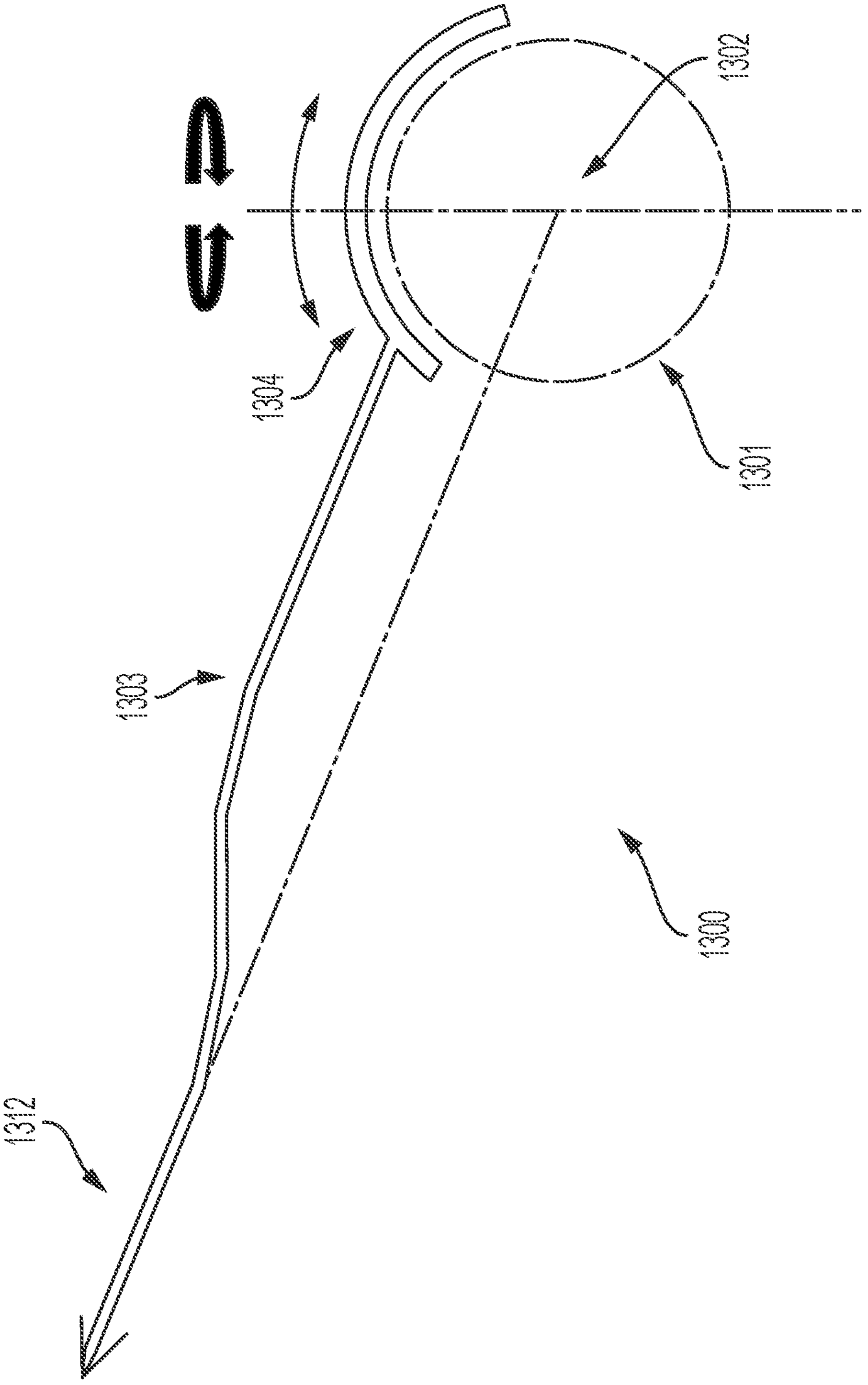
FIG. 13A is a diagram of an embodiment of a scanning and tracking antenna having a ball and socket mechanism for moving the feed.
Figure 13B:
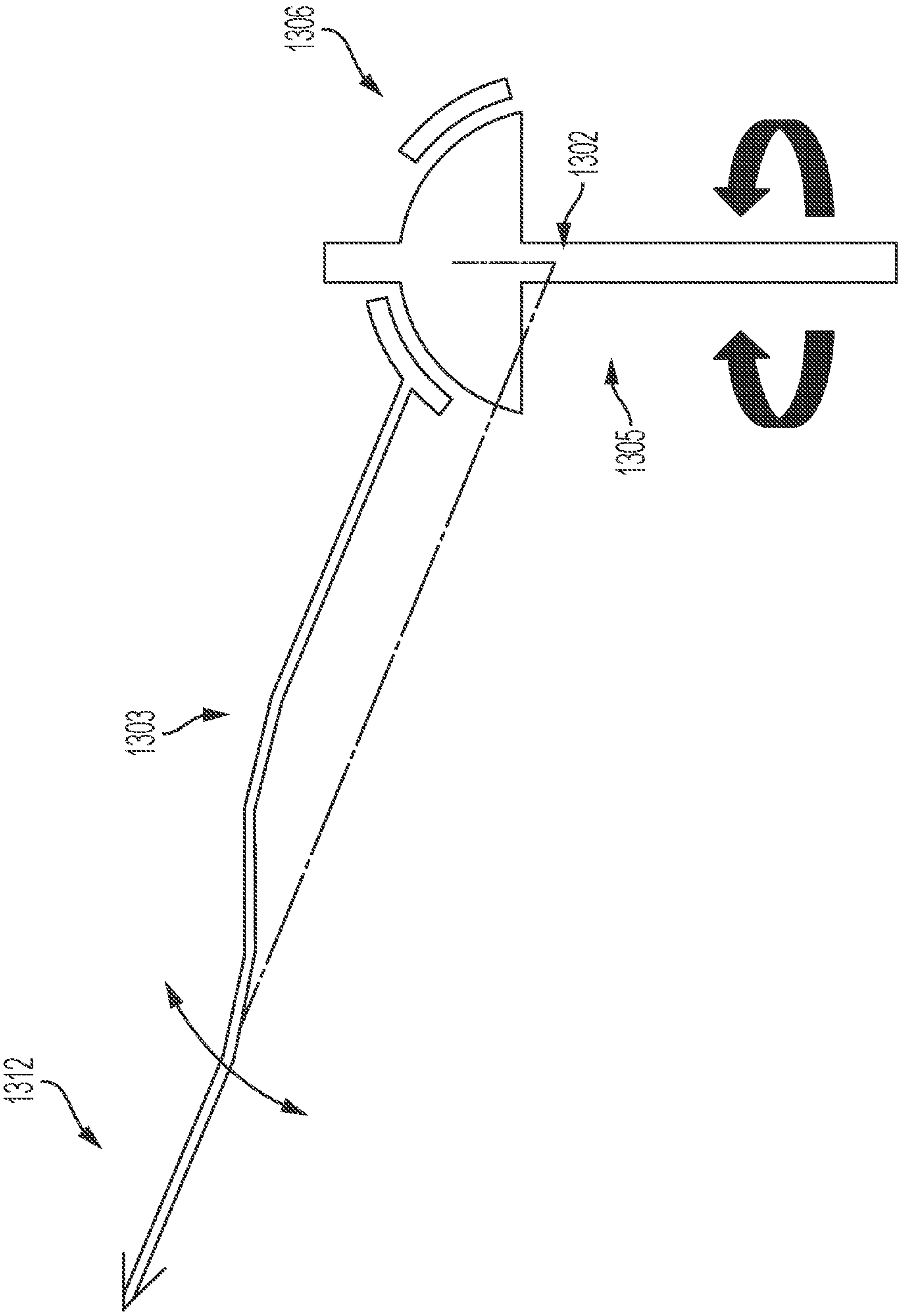
FIG. 13B is a diagram of a modified version of the embodiment of FIG. 13A, where the ball is a partial hemisphere.
Figure 13C:
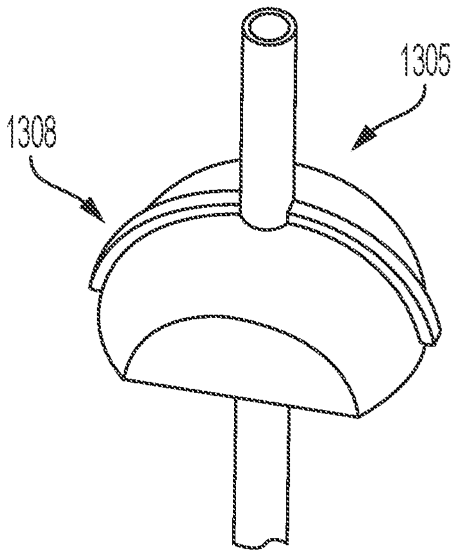
FIG. 13C is a schematic view of the partial hemisphere ball of FIG. 13B.
Figure 13D:
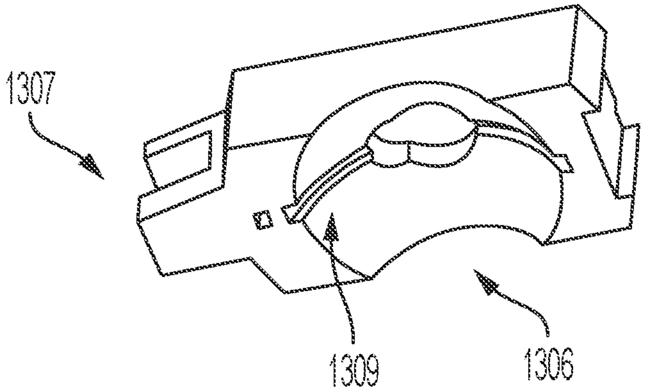
FIG. 13D is a schematic view of the socket mechanism configured to move about the partial hemisphere ball of FIG. 13C.

FIG. 13A is a diagram of an embodiment of a scanning and tracking antenna 1300 having a ball and socket mechanism for moving the feed. FIG. 13B is a diagram of a modified version of the embodiment of FIG. 13A, where the ball is a partial hemisphere. FIG. 13C is a schematic view of the partial hemisphere ball of FIG. 13B. FIG. 13D is a schematic view of the socket mechanism configured to move about the partial hemisphere ball of FIG. 13C.

The spherical center point 1302 of the reflector 1300 includes a small sphere 1301, which is concentric with the reflector (not shown) of the antenna 1300. An antenna feed 1312 is attached to a shell 1304 by a member 1303. By constraining the shell 1304 to follow the surface of the small sphere 1301, the feed 1312 is ensured to point radially. In FIG. 13B, an example of a mechanism capable of constraining a modified shell 1306 to follow the surface of the small sphere 1301 is shown: The small sphere 1301 is converted into a partial hemisphere attached to a shaft 1305. Means are provided for the modified shell 1306 to turn with the shaft 1305, controlling the azimuth angle of the feed 1312. A crest 1308 on the partial hemisphere, shown in FIG. 13C, fits on a groove 1309 on the modified shell 1306, shown in FIG. 13D. Moving the modified shell 1306 along the crest 1308 changes the elevation of the feed 1312, and turning the shaft 1305 changes the azimuth of the feed 1312.

Figure 14:
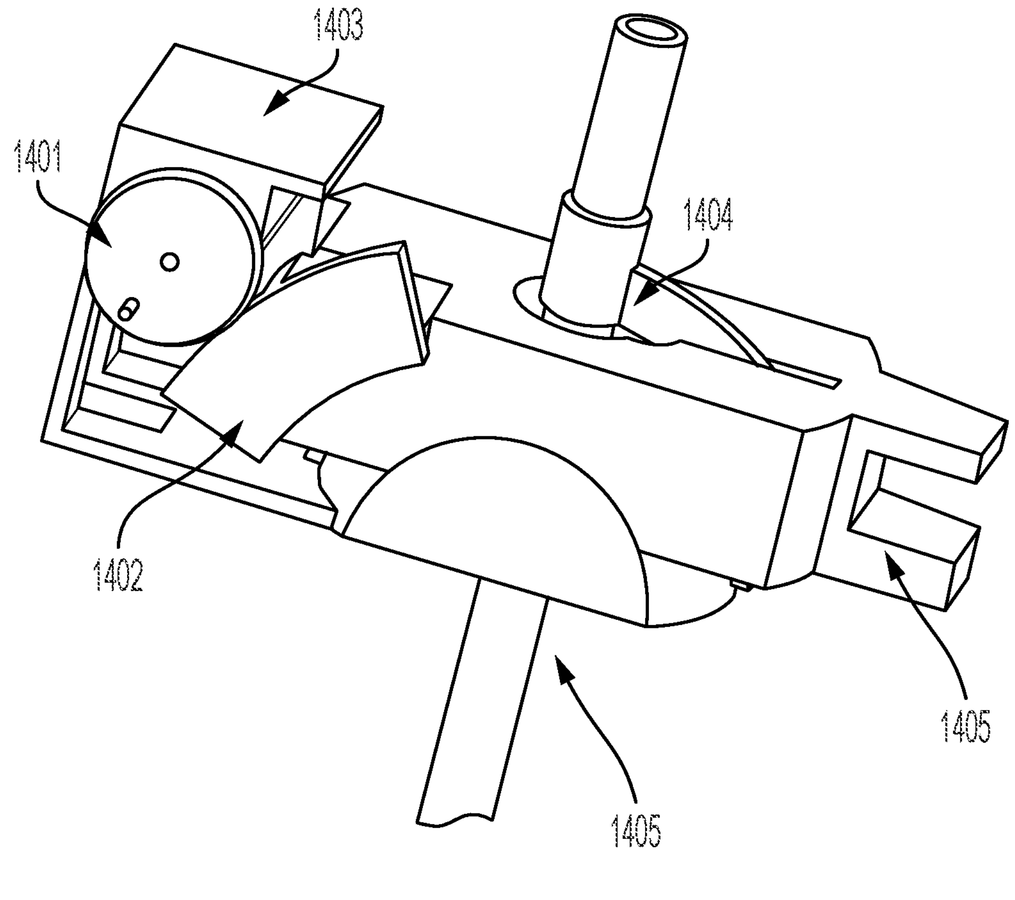
FIG. 14 is a schematic view of a mechanical assembly of the partial hemisphere ball embodiment of the scanning and tracing antenna shown in FIG. 13B.

FIG. 14 is a schematic view of a mechanical assembly of the partial hemisphere ball embodiment of the scanning and tracing antenna 1300 shown in FIG. 13B. A motor 1403 drives a gear or pinion 1402. The gear or pinion 1403 engages with a rack 1402, thereby controlling the elevation of the feed 1312. In addition, an adjustable clamp 1404 keeps the shell 1405 engaged with the shaft 1305. A bracket 1406 connects to the feed 1312.

Figure 15:
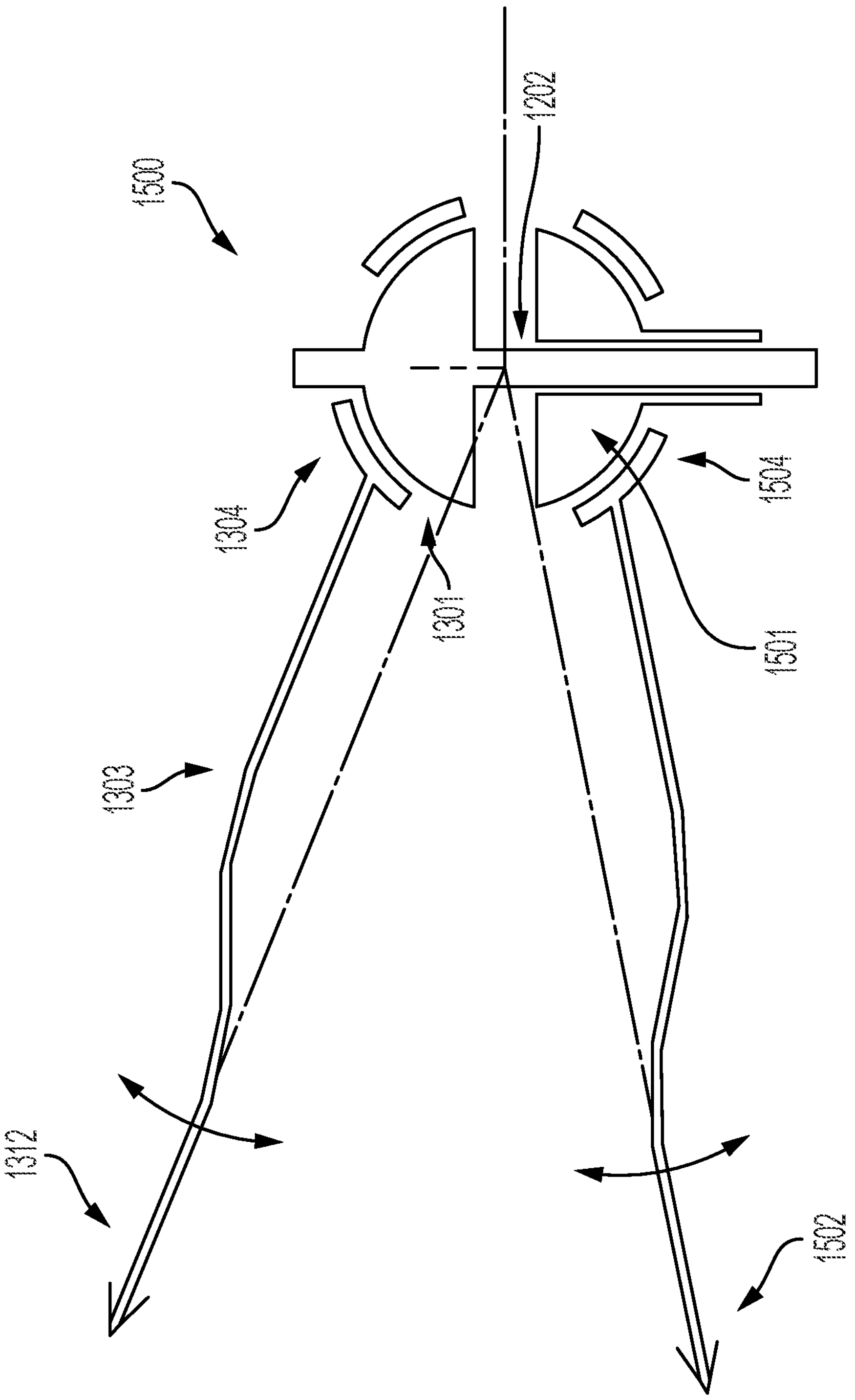
FIG. 15 is a diagram of a modified version embodiment of FIG. 13B, where a second partial hemisphere is coupled to a second socket, coupled to a second feed.

FIG. 15 is a diagram of a modified version of the scanning and tracking antenna 1500 of FIG. 13B, where a second partial hemisphere 1504 is coupled to a second socket, coupled to a second feed 1502. This antenna 1500 incorporates a second feed 1502 operating under the same principles described in FIG. 13A-D. The second feed 1502 includes its own partial hemisphere 1501 and a hollow shaft 1501 to move the azimuth of the second feed. Both feeds 1312, 1502 point radially to the reflector and move independently of each other 1502, 1312.

Figure 16:
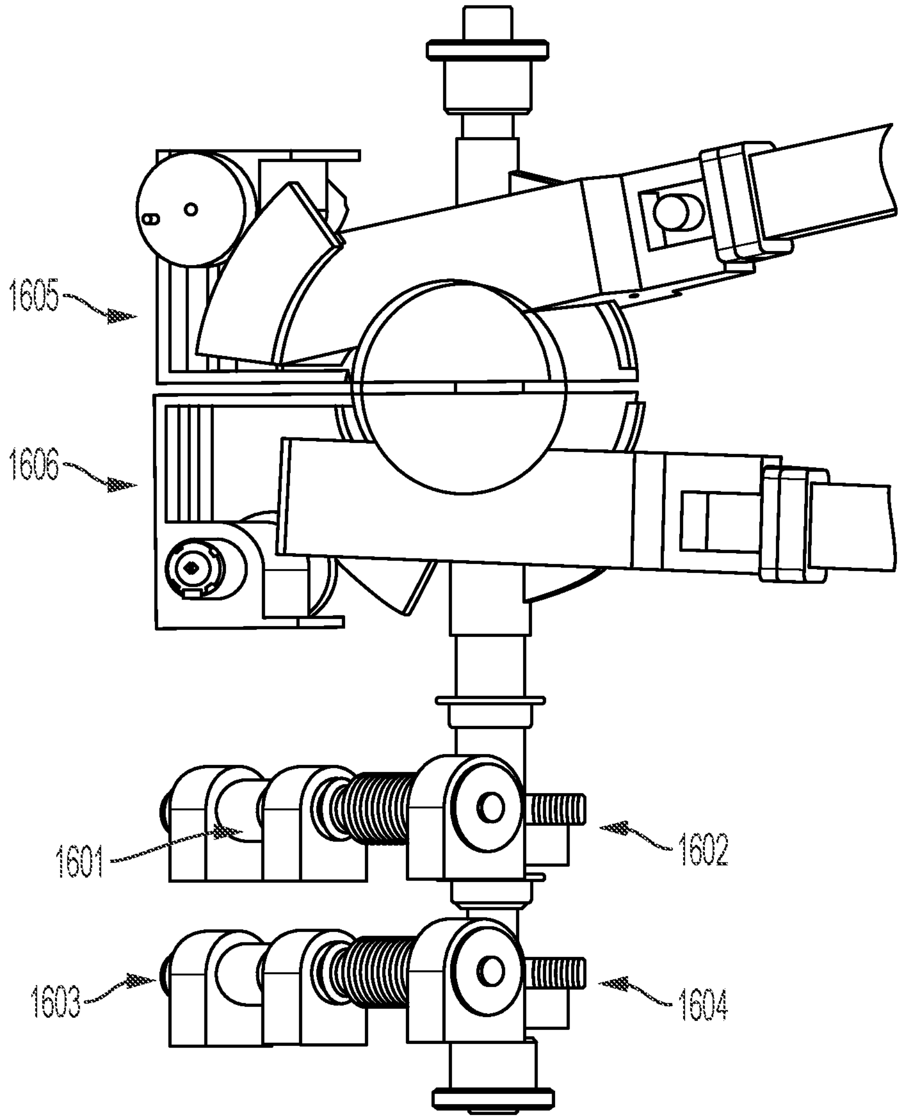
FIG. 16 is a schematic view of a mechanical assembly of the partial hemisphere ball embodiment of the scanning and tracing antenna shown in FIG. 15.

FIG. 16 is a schematic view of a mechanical assembly of the partial hemisphere ball embodiment of the scanning and tracking antenna shown in FIG. 15. The top system 1605 and the bottom system 1606 each are connected to a respective azimuth-controlling motors 1601 and 1603, with set of gears 1602 and 1604.

Figure 17:
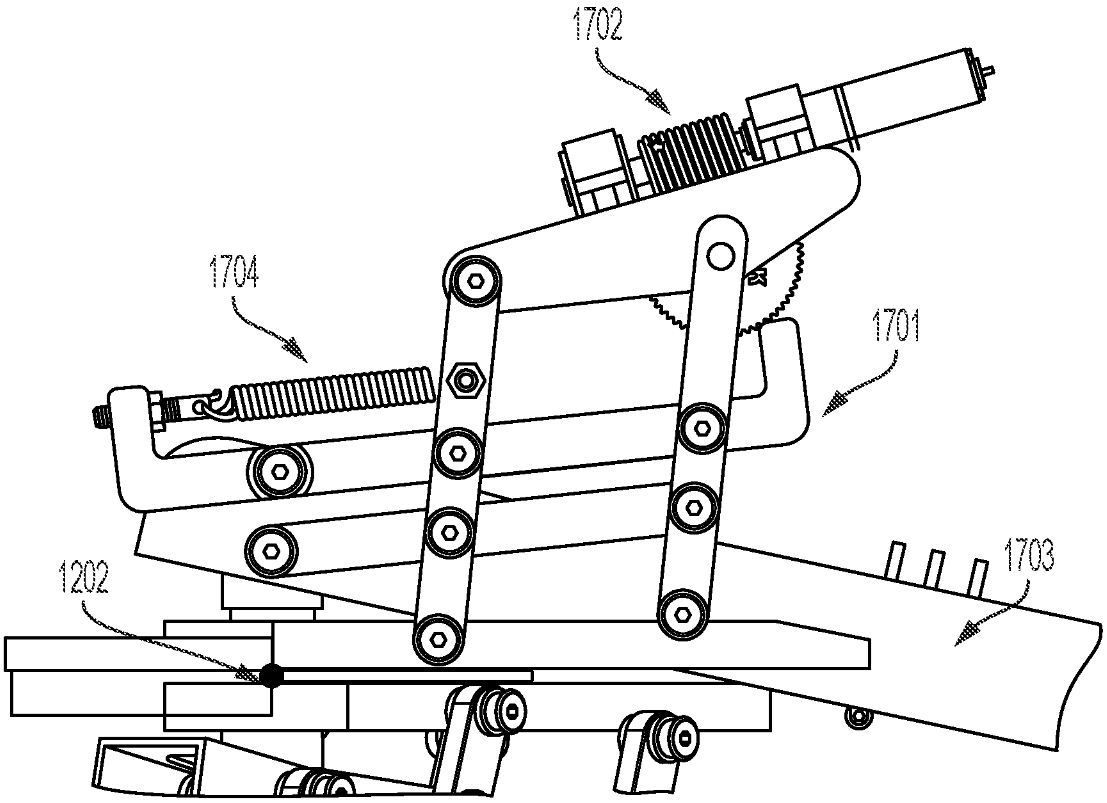
FIG. 17 is a schematic view of an alternative mechanical assembly of the partial hemisphere ball embodiment of the scanning and tracing antenna shown in FIG. 15.

FIG. 17 is a schematic view of an alternative mechanical assembly of the partial hemisphere ball embodiment of the scanning and tracing antenna shown in FIG. 15. A linkage mechanism 1701 is driven by a motor and gear 1702. This mechanism 1701 can change the elevation angle of the bar 1703, keeping a feed at the end of the bar 1703 pointing radially. As in the example of FIG. 16, a similar mechanism can be added under the linkage mechanism 1701 one to control a second feed.

Figure 18:
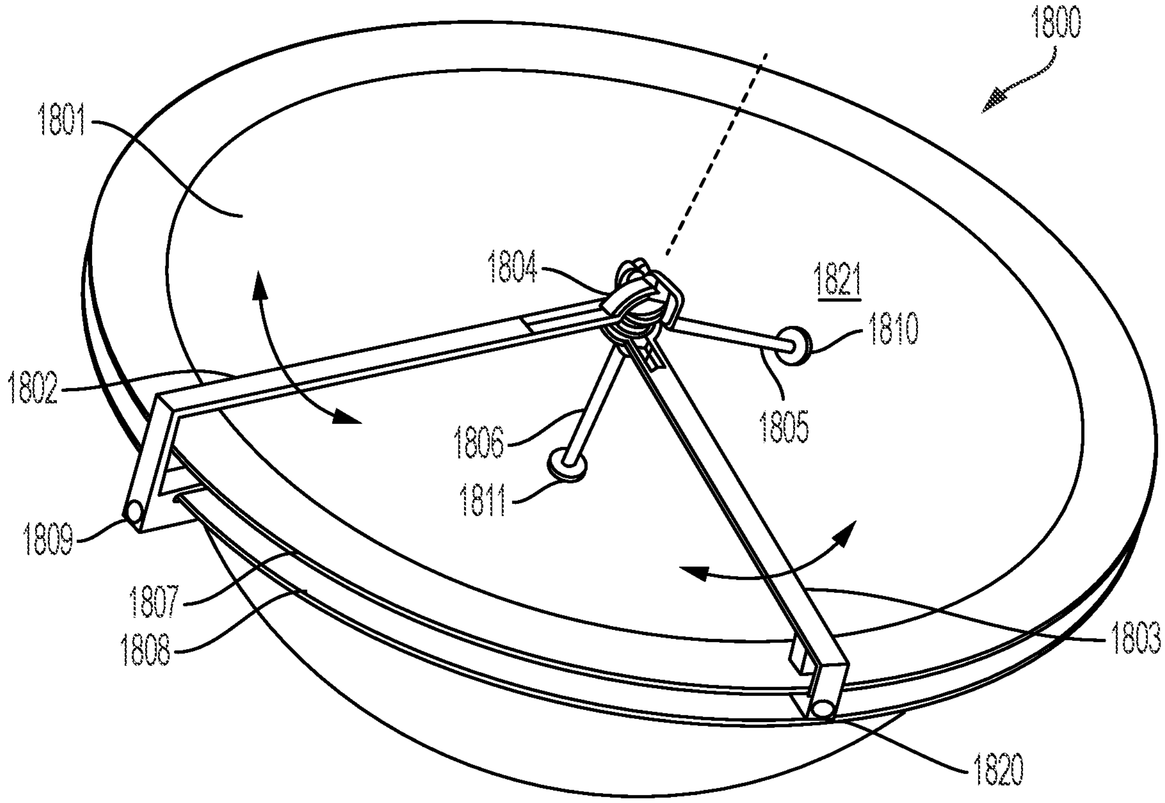
FIG. 18 is a schematic view of still another scanning and tracing antenna having two independent feeds controlled by freely-rotatable, nested azimuth arms.

FIG. 18 is a schematic view of still another scanning and tracking antenna 1800 having two independent feeds 1810, 1811 controlled by freely-rotatable, nested azimuth arms 1802, 1803. Antenna 1800 includes a spherical reflector 1801 cut down to a selected height, and including a first feed 1810 and a second feed 1811 that can be moved independently of each other. The top azimuth arm 1802 and the bottom azimuth arm 1803 rotate around a geometric central axis passing through the center of the sphere 1804, and produce the azimuthal turn of the feed elevation arms 1805, 1806. The two azimuthal arms 1803, 1804 move around the rim of the reflector 1801 using tracks (not shown) on the surfaces 1807, 1808. Motors 1809, 1820 provide means for moving the azimuth arms 1802, 1803 using friction, rack and pinion, or other known methods, while also ensuring that the azimuth arms 1802, 1803 point at all times towards the center axis of the sphere. If needed, added support can be provided by a third arm (potentially in position 1821), the third arm either fixed in position or with its own motor and tracking rim. A third arm with its own motor and tracking rim would position itself approximately opposite to the middle of the area between the azimuth arms 1802, 1803.

Figure 19:
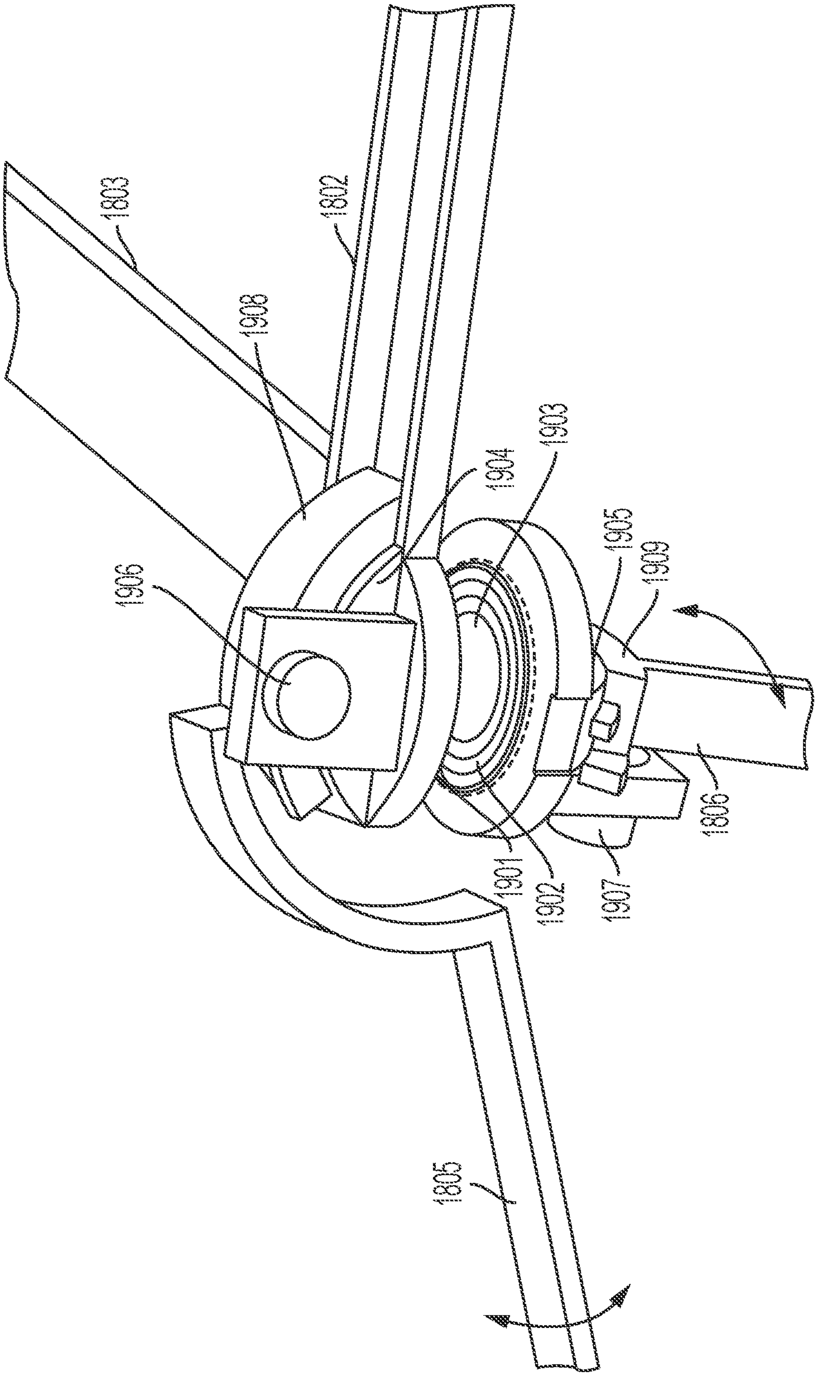
FIG. 19 is a schematic view of the sphere connection between the two nested azimuth arms and their respective elevation arms shown in FIG. 18.

FIG. 19 is a schematic view of the sphere connection between the two nested azimuth arms 1802, 1803 and their respective elevation arms 1805, 1806 shown in FIG. 18. FIG. 19 shows detail regarding a central shaft 1903 and ball bearings 1901 and 1902 (not visible) that connect the shaft 1903 with the azimuth arms 1802, 1803. A top assembly includes the azimuth arm 1802 and the elevation arm 1805 and a bottom assembly includes the azimuth arm 1803 and the elevation arm 1806. The top assembly and the bottom assembly are located symmetrically opposed to each other with respect to the center of the reflector 1801. The azimuth arms 1802, 1803 have a cylindrical shape structure 1904, 1905 such that the cylinders 1904, 1905 have their axis of symmetry passing through the center of the sphere. This condition ensures that the azimuth arms 1802, 1803 extend geometrically to the center of the reflector and are always on a radial axis of symmetry. The elevation motion is implemented by motors 1906, 1907 actuating independently on portion 1908 of the top elevation arm 1805 and 1909 of the bottom elevation arm 1806, which conform to the cylindrical parts 1904 and 1905 of the azimuth arms 1802, 1803.

While not shown, any of the microprocessor and RF beam polarization control programming can be embodied in the steering controller. According to some embodiments, program(s) execute functions defined in the program, such as logic embodied in software or hardware instructions. Various programming languages can be employed to create one or more of the applications, structured in a variety of manners, such as firmware, procedural programming languages (e.g., C or assembly language), or object-oriented programming languages (e.g., Objective-C, Java, or C++). The program(s) can invoke API calls provided by the operating system to facilitate the functionality described herein. The programs can be stored in any type of computer-readable medium or computer storage device and be executed by one or more general-purpose computers. In addition, the methods and processes disclosed herein can alternatively be embodied in specialized computer hardware or an application-specific integrated circuit (ASIC), field-programmable gate array (FPGA), or a complex programmable logic device (CPLD).

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. not shown in the drawings. Volatile storage media include dynamic memory, such as the main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "containing," "contains," "having," "has," "with, or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as 10% from the stated amount. As used herein, the terms "substantially" or "approximately" mean the parameter value varies up to ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A reflective antenna system for transmitting and receiving electromagnetic radiation, comprising:
- a reflector that includes a spherical reflective surface; and
- a first feed assembly configured to provide the electromagnetic radiation in a first certain direction; and
- a second feed assembly configured to provide the electromagnetic radiation in a second certain direction,
- wherein the reflector includes:
  - a first feed support member that is configured to reach a spherical center point of the reflector and have a first end portion attached to a reflector rim of the reflector such that the first feed support member is rotatable about its axis; and
  - a second feed support member that is configured to reach the spherical center point of the reflector and have a second end portion attached to the reflector rim of the reflector such that the second feed support member is rotatable about its axis.

2. The antenna system according to claim 1, wherein the first feed assembly includes:
- a dual circular polarization feed that is located along a radial line of the spherical reflector; and
- RF instruments connected with the dual circular polarization feed, thereby allowing the reflector to transmit the electromagnetic radiation, to receive the electromagnetic radiation, or transmit and receive the electromagnetic radiation.

3. The antenna system according to claim 2, wherein a dual circular polarization feed includes a polarizer and a waveguide such that the polarizer is arranged between the waveguide and the RF instruments.

4. The antenna system according to claim 1, wherein the reflector includes:
- a first elevation support member that is configured to attach to the first feed support member, such that the first elevation support is rotatable about a first axis perpendicular to the axis of the first feed support member; and
- a second elevation support member that is configured to attach to the second feed support member, such that the first elevation support is rotatable about a second axis perpendicular to the axis of the second feed support member.

5. The antenna system according to claim 1, further comprising a dual motor mechanism including a first motor and a second motor, the first motor configured to move the first feed assembly in a first plane, and the second motor configured to move the first feed assembly in a second plane perpendicular to the first plane.

6. The antenna system according to claim 1, wherein the RF instruments:

include a block upconverter (BUC) and power amplifier (PA) for transmitting the electromagnetic radiation, and/or a low noise block (LNB) for receiving the electromagnetic radiation;

serve as a transceiver; or the RF instruments include a power amplifier (PA) and a low noise amplifier (LNA).

7. The antenna system according to claim 1, wherein:

the first feed is positioned at a first predetermined focal distance from the reflective surface of the reflector; and the second feed is positioned at a second predetermined focal distance from the reflective surface of the reflector.

8. The antenna system according to claim 1, wherein the first feed is mechanically moved to various positions to enable RF reception or transmission with satellites by reflected energy, and the second feed is mechanically moved to various positions to enable RF reception or transmission with the satellites by the reflected energy.

9. The antenna system according to claim 8, wherein:

the first feed is mechanically moved by a first dual-motor system; and the second feed is mechanically moved by a second dual-motor system.

10. The antenna system according to claim 1, wherein:

the first feed assembly provides the electromagnetic radiation in the first certain direction using the reflector; and the second feed assembly provides the electromagnetic radiation in the second certain direction using the reflector.

11. The antenna system according to claim 1, wherein:

the first feed assembly is further configured to provide the electromagnetic radiation at a first operation frequency;

the second feed assembly is further configured to provide the electromagnetic radiation at a second operation frequency; and the first operation frequency is the same frequency as the second operation frequency.

12. A reflective antenna system for transmitting and receiving electromagnetic radiation, comprising:

a reflector that includes a spherical reflective surface; and a first feed assembly configured to provide the electromagnetic radiation in a first certain direction; and a second feed assembly configured to provide the electromagnetic radiation in a second certain direction;

wherein:

the first feed assembly is configured to enter a first pointing mode and a first tracking mode;

the second feed assembly is configured to enter a second pointing mode and a second tracking mode;

the first feed assembly is further configured to enter the first tracking mode only if the second feed assembly is in any mode other than the second tracking mode; and the second feed assembly is further configured to enter the second tracking mode only if the first feed assembly is in any mode other than the first tracking mode.

13. A reflective antenna system for transmitting and receiving electromagnetic radiation, comprising:

a reflector that includes a spherical reflective surface; and a feed assembly configured to provide the electromagnetic radiation in a first certain direction, the feed assembly including:

a dual circular polarization feed that is located along a radial line of the spherical reflector; and RF instruments connected with the dual circular polarization feed, thereby allowing the reflector to transmit the electromagnetic radiation, to receive the electromagnetic radiation, or transmit and receive the electromagnetic radiation;

wherein the reflector includes a feed support member, coupled to a shell that is configured to move about a sphere centered at a spherical center point of the reflector, such that the feed support member is rotatable about its axis.

14. The antenna system according to claim 13, further comprising a dual motor mechanism including a first motor and a second motor, the first motor configured to move the feed assembly with respect to the feed support member in a first plane, and the second motor configured to move the feed assembly in a second plane perpendicular to the first plane.

15. The antenna system according to claim 13, wherein the feed is mechanically moved to various positions to enable RF reception or transmission with satellites by reflected energy.

16. A reflective antenna system for transmitting and receiving electromagnetic radiation, comprising:

a reflector that includes a spherical reflective surface; and a feed assembly configured to provide the electromagnetic radiation in a first certain direction, the feed assembly including:

a dual circular polarization feed that is located along a radial line of the spherical reflector; and RF instruments connected with the dual circular polarization feed, thereby allowing the reflector to transmit the electromagnetic radiation, to receive the electromagnetic radiation, or transmit and receive the electromagnetic radiation;

wherein the reflector includes a feed support member, coupled to a shell that is configured to move about a partial hemisphere centered at a spherical center point of the reflector, such that the feed support member is rotatable about its axis.

17. The antenna system according to claim 16, further comprising a second feed assembly configured to provide the electromagnetic radiation in a second certain direction;

wherein the reflector includes a second feed support member, coupled to a second shell that is configured to move about a second partial hemisphere centered at the spherical center point of the reflector, such that the second feed support member is rotatable about its axis.

18. The antenna system according to claim 17, further comprising:

a first supporting structure configured to support the partial hemisphere;

a first shaft motor configured to move the feed support member about its axis; and a second shaft motor configured to move the second feed support member about its axis.

* * * * *